United States Patent
Rey et al.

(10) Patent No.: US 8,331,365 B2
(45) Date of Patent: *Dec. 11, 2012

(54) ADAPTIVE AND SCALABLE QOS ARCHITECTURE FOR SINGLE-BEARER MULTICAST/BROADCAST SERVICES

(75) Inventors: Jose Luis Rey, Darmstadt (DE); Ivica Rimac, Darmstadt (DE); Rolf Hakenberg, Darmstadt (DE)

(73) Assignee: Panasonic Corporation, Osaka (JP)

( * ) Notice: Subject to any disclaimer, the term of this patent is extended or adjusted under 35 U.S.C. 154(b) by 667 days.

This patent is subject to a terminal disclaimer.

(21) Appl. No.: 11/630,028

(22) PCT Filed: Jun. 17, 2005

(86) PCT No.: PCT/EP2005/006564
§ 371 (c)(1),
(2), (4) Date: Dec. 28, 2007

(87) PCT Pub. No.: WO2005/125118
PCT Pub. Date: Dec. 29, 2005

(65) Prior Publication Data
US 2008/0212583 A1 Sep. 4, 2008

(30) Foreign Application Priority Data
Jun. 21, 2004 (EP) .................... 04014513

(51) Int. Cl.
*H04L 12/28* (2006.01)
(52) U.S. Cl. ........................................ 370/390
(58) Field of Classification Search .................. 370/390
See application file for complete search history.

(56) References Cited

U.S. PATENT DOCUMENTS

| | | | |
|---|---|---|---|
| 5,719,942 A | 2/1998 | Aldred et al. | |
| 6,445,679 B1 * | 9/2002 | Taniguchi et al. | 370/232 |
| 6,587,457 B1 * | 7/2003 | Mikkonen | 370/356 |

(Continued)

FOREIGN PATENT DOCUMENTS
EP 1213895 6/2002
(Continued)

OTHER PUBLICATIONS
3GPP TS 22.246 V6.1.0, Mar. 2004.*
(Continued)

*Primary Examiner* — Ayaz Sheikh
*Assistant Examiner* — Hai-Chang Hsiung
(74) *Attorney, Agent, or Firm* — Dickinson Wright PLLC

(57) ABSTRACT

The present invention relates to a method for filtering a multiplexed packet stream in a network entity of the core network or the radio access network of a mobile communication system. The multiplexed packet stream provides a multicast or broadcast service and is delivered from a service center via the network entity to a mobile terminal. Further, the network entity comprises a service manager providing a quality-of-service management function. The invention further relates to a network entity provided with filtering capabilities, as well as to a communication system comprising the network entity. To provide an adaptive multimedia broadcast/multicast service QoS architecture that is scalable to a great number of users the invention suggests providing the service in form of a multiplexed packet stream via a single bearer service an equipping nodes within the distribution tree of the service filter capability allowing to filter the multiplexed stream based on the downlink quality-of-service constraints obtained from a service manager.

28 Claims, 15 Drawing Sheets

U.S. PATENT DOCUMENTS

| | | | |
|---|---|---|---|
| 7,003,794 B2 | 2/2006 | Arye | |
| 7,801,480 B2 * | 9/2010 | Becker | 455/3.06 |
| 7,957,738 B2 * | 6/2011 | Rey et al. | 455/435.1 |
| 2002/0032800 A1 | 3/2002 | Puuskari et al. | |
| 2002/0036983 A1 | 3/2002 | Widegren et al. | |
| 2002/0131365 A1 | 9/2002 | Barker et al. | |
| 2002/0152319 A1 | 10/2002 | Amin et al. | |
| 2003/0007515 A1 * | 1/2003 | Apostolopoulos et al. | 370/503 |
| 2003/0013453 A1 * | 1/2003 | Lavaud et al. | 455/450 |
| 2003/0032433 A1 * | 2/2003 | Daniel et al. | 455/452 |
| 2003/0169751 A1 * | 9/2003 | Pulkka et al. | 370/401 |
| 2004/0032828 A1 | 2/2004 | Satt | |
| 2004/0076332 A1 * | 4/2004 | Lin et al. | 382/236 |
| 2004/0083287 A1 | 4/2004 | Gao et al. | |
| 2005/0053068 A1 * | 3/2005 | Toth et al. | 370/390 |

FOREIGN PATENT DOCUMENTS

| | | |
|---|---|---|
| EP | 1213895 A1 * | 6/2002 |
| JP | 2004-502356 | 1/2004 |
| WO | 0057607 | 9/2000 |
| WO | 03063425 | 7/2003 |

OTHER PUBLICATIONS

PCT International Search Report dated Nov. 28, 2005.
S. Blake, et al.; "An Architecture for Differentiated Services," RFC 2475, Dec. 1998, pp. 1-36.
R. Braden et al.; "Resource ReSerVation Protocol (RSVP) Version 1 Message Processing Rules," RFC 2209, Sep. 1997, pp. 1-25.
R. Hancock, et al.; "Next Steps in Signaling: Framework," draft-ietf-nsis-fw-05.txt, Oct. 2003, pp. 1-45.
S. McCanne, et al.; "Receiver-driven Layered Multicast," SIGCOMM, Aug. 1996, Stanford, CA, pp. 1-14.
W. Fenner; "Internet Group Management Protocol, Version 2," RFC 2236, Nov. 1997, pp. 1-24.
E. Amir, et al.; "An Application Level Video Gateway," ACM Multimedia, Nov. 1995, San Franscisco, CA, pp. 1-10.
B. Metzler, et al. "Amnet: Heterogeneous Multicast Services based on Active Networking," Proceedings of the 2nd Workshop on Open Architecture and Network Programming (OPENARCH99), New York, Mar. 1999, pp. 98-105.
3GPP TR 23.846 6.1.0 (Dec. 2002); 3rd Generation Partnership Projects; Technical Specification Group Services and System Aspects; Multimedia Broadcast/Multicast Service (MBMS); Architecture and functional description (Release 6), pp. 1-114.
3GPP TS 22.246 V6.1.0 (Mar. 2004); 3rd Generation Partnership Project; Technical Specification Group Services and System Aspects; Multimedia Broadcast/Multicast Service (MBMS) user services; Stage 1, (Release 6), pp. 1-16.
3GPP TS 23.246 V6.2.0 (Mar. 2004); 3rd Generation Partnership Project; Technical Specification Group Services and System Aspects; Multimedia Broadcast/Multicast Service (MBMS); Architecture and functional description (Release 6), pp. 1-40.
R. Braden, et al.; "Integrated Services in the Internet Architecture: an Overview," RFC 1633, Jun. 1994, pp. 1-33.
3GPP TS 23.107 V6.1.0 (Mar. 2004, 3rd Generation Partnership Project; Technical Specification Group Services and System Aspects; Quality of Service (QoS) concept and architecture (Release 6), pp. 1-41.
3GPP TS 29.060 V6.4.0 (Mar. 2004), 3rd Generation Partnership Project; Technical Group Core Network; General Packet Radio Services (GPRS); GPRS Tunnelling Protocol (GTP) across the Gn and Gp interface (Release 6), pp. 1-113.
A. Vetro, et al.; "Video Transcoding Architectures and Techniques: An Overview," IEEE Signal Processing Magazine, Mar. 2003, pp. 18-29.
Y.-C. Lin, et al.; "Efficient FGS to Single Layer Transcoding," IEEE Int. conf. consumer electronics, Los Angeles, CA Jun. 2002, pp. 134-135.
P. Yin, et al.; "Drift Compensation for Reduced Spatial Resolution Transcoding," IEEE Transactions on Circuits and Systems for Video Technology, vol. 12, No. 11, Nov. 2002, pp. 1009-1020.
Office Action in the corresponding Japanese Patent Application dated Aug. 2, 2010, with English translation.
K. Sebayashi, et al., "ATM Multicast Communication Methods with Multiple QoS Guarantee," NTT Multimedia Networks Laboratories, NTT R&D vol. 46 No. 3, Mar. 1997, pp. 191-198, with English abstract.

* cited by examiner

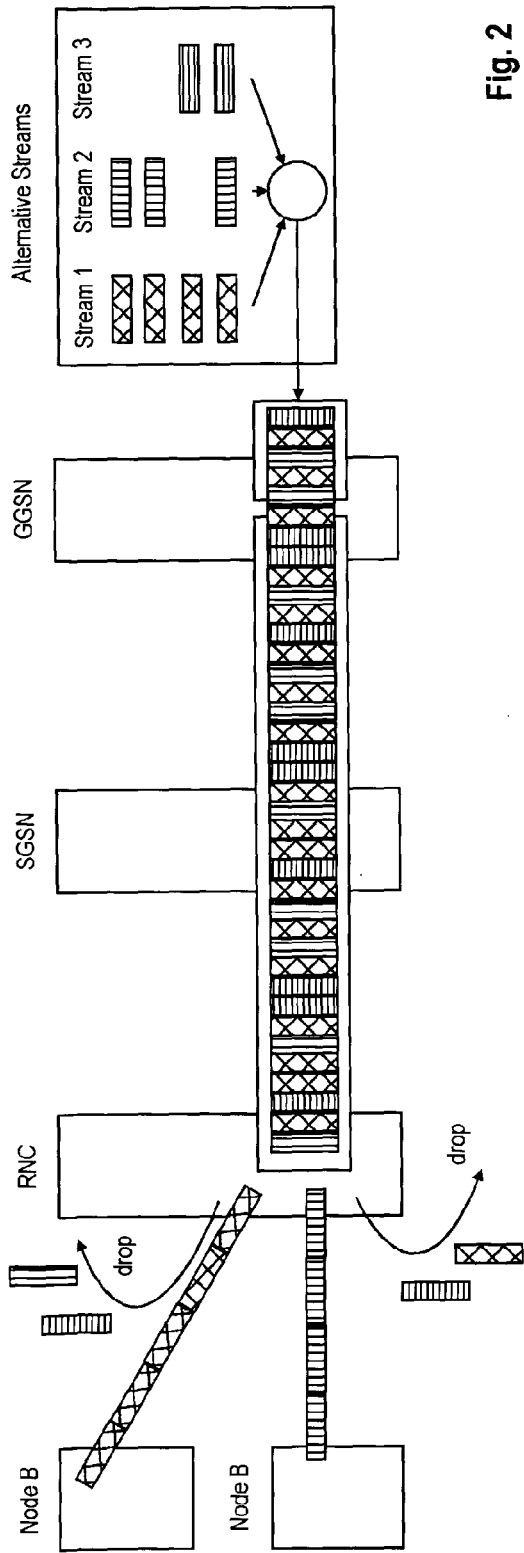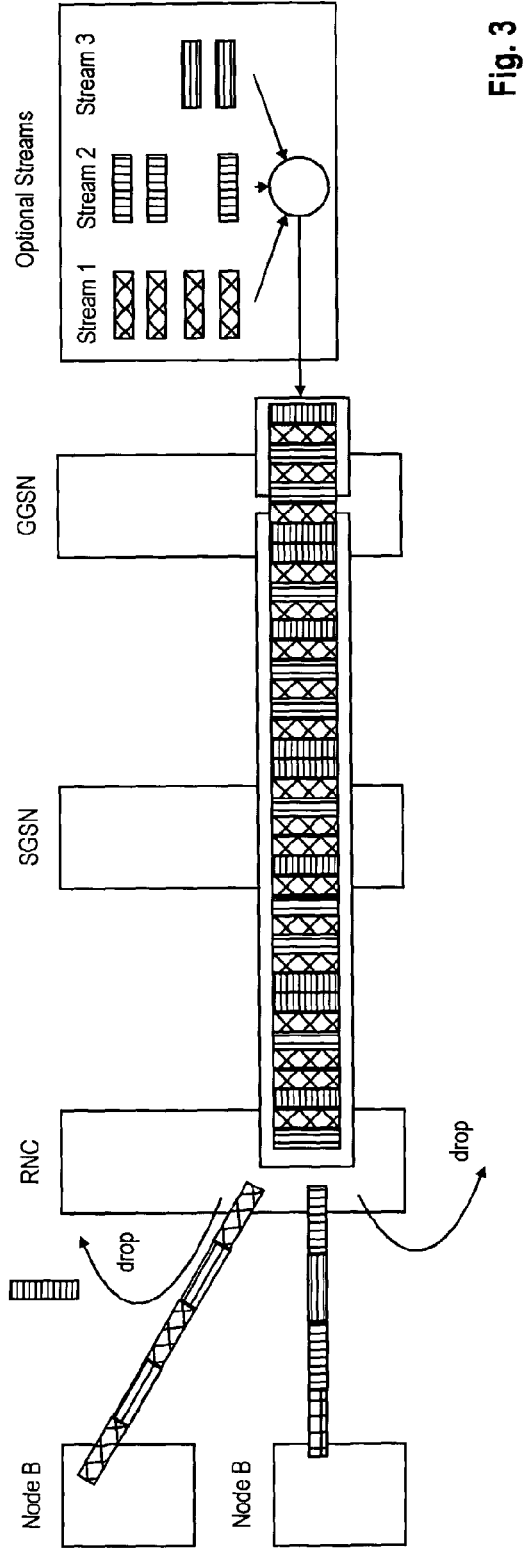

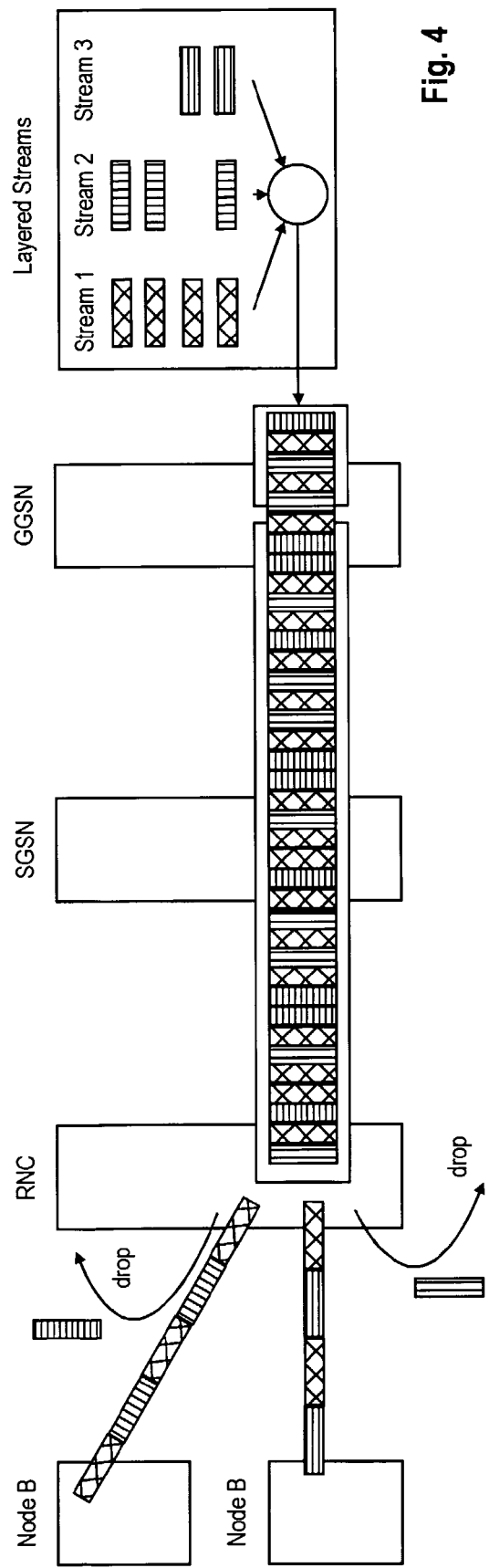

ADAPTIVE AND SCALABLE QOS ARCHITECTURE FOR SINGLE-BEARER MULTICAST/BROADCAST SERVICES

FIELD OF THE INVENTION

The present invention relates to a method for filtering a multiplexed packet stream in a network entity of the core network or the radio access network of a mobile communication system. The multiplexed packet stream provides a multicast or broadcast service and is delivered from a service center via the network entity to a mobile terminal. Further, the network entity comprises a service manager providing a quality-of-service management function. The invention further relates to a network entity provided with filtering capabilities, as well as to a communication system comprising the network entity.

TECHNICAL BACKGROUND

Recent advances in coding techniques allow for transporting the data of a broadcast/multicast service onto multiple streams, e.g. alternative (simulcast) or optional (layered multicast). Such approaches have attracted attention of the Internet community for enabling coarse-grained quality adaptation in multicast communication and several works have built on these, as for example DiffServ (Differentiated Services—see Blake et al., "An Architecture for Differentiated Services", RFC 2475, 1998), RSVP (see Braden et al., "Resource ReSerVation Protocol (RSVP)—Version 1 Message Processing Rules", RFC 2209, 1997), or NSIS (see Hancock, "Next Steps in Signaling: Framework", Internet Draft, 2003). However, the architecture of 3 G communication networks, e.g. like that of 3GPP networks, differs from that of the Internet and thus demands different or additional solutions.

The increasing diffusion of bandwidth-intensive multimedia applications to heterogeneous groups of users led to intensive research in the area of multicast rate and congestion control in the Internet. Since the pioneer work of McCanne et al. (see McCanne et al., "Receiver-driven Layered Multicast", Proceedings of ACM SIGCOMM '96, p. 117 to 130, 1996), multi-rate multicast has been considered as a very promising approach for rate adaptation in streaming scenarios. Techniques have been proposed for transmitting the same content using multiple multicast groups mapping onto different quality levels, based on a cumulative layered data organization (hierarchically encoded) or on stream replication (independent and alternative streams). Moreover, a combination of both approaches is also possible. For example, a session of a single audio stream and several alternative video streams encoded with a standard coding scheme at different data rates or robust to different loss rates.

Generally, the Internet Multicast Model provides basic mechanisms for distributing data with different QoS parameters to subsets of the multicast distribution trees. The hosts, which communicate with the multicast routers using the Internet Group Management Protocol (IGMP—see Fenner, "Internet Group Management Protocol, Version 2", RFC 2236), can in principle actively adapt the QoS in a sub tree by joining/leaving multicast groups.

However, not all communication networks, e.g. mobile communications networks, follow Internet's end-to-end paradigm. In this regard, compliance to the end-to-end principle means that end hosts are responsible for adaptation to network conditions, relying exclusively on implicit network signaling, i.e., packet drops and delay variations.

Mobile communications networks, on the other hand, usually follow a network-centric approach for QoS provision, resulting in a different Broadcast/Multicast Service Model. Subscribed users are allowed to express their interest on a multicast session by IGMP or similar signaling to dedicated network nodes. The data distribution tree along which service data are provided, however, is build autonomously and modified by the network when necessary, e.g., in response to handover. This approach is advantageous in particular since the radio network controller has the knowledge of available resources (e.g. by providing resource control functionality), and it allows end users to be provided with a more or less seamless service.

Network-centric approaches for providing heterogeneous communication services in the Internet have also been developed. A well-known way to place enhanced functionality within the network is the establishment of transport-level or application-level gateways, or the introduction of active network nodes, as presented in Amir et al. "An application level video gateway", Proceeding of ACM Multimedia '95, San Francisco, Calif., USA, November 1995 or in Metzler et al., "AMnet: Heterogeneous Multicast Services based on Active Networking", Proceedings of the 2nd Workshop on Open Architectures and Network Programming (OPENARCH99), New York, N.Y., USA, March 1999, respectively.

While the former approach imposes significant overhead due to transcoding operations, the latter approach provides a framework that would have to be adapted in each case to provide network-specific functionalities and mechanisms.

The first concept for a heterogeneous QoS in the MBMS Architecture was proposed as Option G in the 3GPP TR 23.846: "Multimedia Broadcast/Multicast (MBMS); Architecture and functional description (Release 6)", V6.1.0, December 2002. It defines a MBMS Bearer Service that may include multiple streams (optional or alternative), each mapping to a single RTP instance. Each stream is transported over a unique tunnel between GGSN (Gateway GPRS Support Node) and RNC (Radio Network Controller), which is maintained throughout the duration of a MBMS service.

Thereby, it is in principle possible for a RNC to choose a stream of a MBMS service at session start as well as changing/adding streams during the session. However, in order to allow for this functionality, appropriate mechanisms have to be implemented in the radio access network (RAN). A necessary prerequisite is the communication and management of stream states and relations, which allows a RAN node to choose the (set of) appropriate streams according to the current conditions of a cell or downstream nodes The 3GPP Multimedia Broadcast/Multicast Service (MBMS) Architecture currently only supports a very simple QoS model. It basically provides a non-scalable and non-adaptive service, where either all branches of a MBMS distribution tree are established with the same QoS or the whole service is cancelled. There is no negotiation of QoS values between network nodes, which implies that some of the branches may not be established if QoS requirements cannot be met by the according network nodes. This is relevant both at the beginning of a session or during a session, e.g., at each handover, when a new branch of the distribution tree has to be created/torn down.

On the other hand, mobile terminals are quite heterogeneous with respect to their provided capabilities, i.e., processing power, display size, etc. The current MBMS architecture cannot cope with this heterogeneity or it can by subjecting all terminals (those with better and worse capacity) to a worst case scenario, where all adapt to the lowest quality.

SUMMARY OF THE INVENTION

The object of the present invention is to provide an adaptive multimedia broadcast/multicast service QoS architecture that is scalable to a great number of users. A further object is to provide a broadcast/multicast service QoS architecture that is able to cope with heterogeneous terminals. Another object is to design an architecture allowing adapting to varying network conditions.

The object is solved by the subject matter of the independent claims. Advantageous embodiments of the present invention are subject matters to the dependent claims.

According to an embodiment of the present invention a method for filtering a multiplexed packet stream in a network entity of the core network or the radio access network of a mobile communication system is provided. The multiplexed packet stream provides a multicast or broadcast service and is delivered from a service center via the network entity to a mobile terminal. Further, the network entity comprises a service manager providing a quality-of-service management function.

The method may comprise the steps of the network entity receiving a broadcast or multicast service via a single bearer service, wherein the multicast or broadcast service is received in form of a multiplexed packet stream comprising a plurality of packet streams each being associated to quality-of-service attributes, and the network entity receiving information indicating the quality-of-service attributes of each of the plurality of packet streams and/or of combinations of packet streams of the multiplexed packet stream.

Further, the network entity may obtain from the quality-of-service management function quality-of-service constraints indicating a quality-of-service available for downstream data transmission. Generally, the quality-of-service management function may provide the quality-of-service-constraints for each downstream interface of the network entity. In a further step the network entity may select those packet streams of the plurality of packets streams that can be transmitted to the mobile terminal within the quality-of-service constraints obtained from the quality-of-service management function, wherein the selection is based on the received quality-of-service attributes of the packet streams of the multiplexed packet stream. Upon having selected the packet streams of the multiplexed packet stream providing the multicast or broadcast service same are transmitted to the mobile terminal.

According to this embodiment, the network entity is provided with filtering capabilities that enable network entity to filter the compound packet stream comprising a plurality of individual streams by selecting those stream(s) or combinations thereof, which may be transmitted downstream towards the mobile terminal within the quality-of-service constraints obtained from the quality-of-service function. In order to determine which of the plurality of streams of the service (or which combination of streams) may be relayed downstream, the quality-of-service attributes received by the network entity are employed to match quality-of-service requirements of the streams and the available downstream resources. Thereby, the multicast or broadcast service may be provided using alternative, layered or complementary streams which are multiplexed to a radio bearer or to be more precise to the transport channel thereof.

It should be further noted that—according to a variation of this embodiment—the quality-of-service attributes for combinations may be indicated by either indicated explicitly by indicating the attributes of possible stream combinations or implicitly by indicating the individual attributes of each of the plurality of packet streams and their interrelation, e.g. which streams may be combined, which streams are alternative streams, etc.

In another embodiment, the network entity may be any entity of the radio access network of the mobile communication system having quality-of-service management functionality or any entity of the core network having quality-of-service management functionality. Further, it is noted that there may be more than one network entity filtering the multiplexed packet stream provided along the distribution tree along which the multicast or broadcast service is provided to the mobile terminal.

According to another embodiment, the network entity may further receive information indicating transport identifiers of the individual packet streams for demultiplexing the individual packet streams from the multiplexed data stream. Since the individual streams are provided in multiplexed form, the network entity may use the transport identifiers to select and demultiplext those packets streams from the transport channel of the bearer service that may be transmitted downstream within the quality-of-service constraints obtained from the quality-of-service management function. Hence, the transport identifiers may allow the network entity to recognize individual packet streams of the received multiplexed data stream.

In a variation of the embodiment, the UDP port numbers comprised in UDP packets of the packet streams, the values set in the type of service field of the IP header comprised in IP packets delivering the packet streams, the DiffServ CodePoint value set in the IP header comprised in IP packets delivering the packet streams or MPLS labels assigned to the headers of the data packets transporting the packet streams of the multiplexed packet stream may be used as a transport identifier.

According to a further embodiment, the network entity multiplexes the selected packet streams to a new multiplexed packet stream before forwarding same downstream.

In a further embodiment, the network entity may establish a context comprising information relevant for the filtering of the multiplexed packet stream. In this respect, the context may also indicate the state of each stream i.e. whether same is forwarded or dropped by the network entity. The method may therefore further comprise the step of forming a multicast or broadcast service related context comprising the information indicating the required quality-of-service attributes of the packet streams and/or of the combinations of packet streams of the multiplexed packet stream and the packet streams selected for forwarding. In another embodiment, the selection of packets streams for forwarding same downstream is based on the context.

Another embodiment of the invention is related to the adaptation of the filtering procedure to changing downlink capabilities, as for example changes in the downlink quality-of-service constraints or changes in the contexts maintained by other downlink network entities provided with filtering capabilities.

In this respect, the network entity may monitor the available downstream resources at the network entity's interfaces using the quality-of-service management function of the network entity, and may update the context accordingly. The update may, for example, be performed by selecting those packet streams of the plurality of packets streams that can be provided to the mobile terminal within the constraints implied by the monitored available downstream resources and by updating the information in the context based on the selection, in case a change in the monitored results has been monitored.

Further, the network entity may transmit information indicating the network entity's context to at least one upstream network entity, in case the network entity's context is updated. As will be described in more detail, the receiving upstream network entity may use this information to update its own maintained context and to adapt the filtering procedure accordingly, if necessary.

In a variation of this embodiment, the network entity may receive information indicating at least one context from downstream network entities indicating the respective downstream quality-of-service that can be provided. Based on information indicating the at least one context, the network entity may update its context if necessary.

Updating of the network entity's context and basing the filtering procedure on the information maintained in the context, an adaptation of the filtering procedure, i.e. the selection of streams and their forwarding, may be performed in order to allow adapting to changing downlink capabilities. For example, even if the downlink resources towards the next downstream network entity may be sufficient to forward an audio stream and a video stream, but the maintained context indicates that the video stream may be not forwarded further downstream, the network may thus only forward the audio stream.

Another embodiment of the present invention relates to the signalling of employed in order to allow the adaptation of the filtering procedure to changing downlink capabilities. According to this embodiment, the network entity may receive from a downstream entity an request to upgrade or downgrade the quality-of-service level provided for the multiplexed packet stream transporting the multicast or broadcast service, and may—in response—transmit an a message indicating whether the quality-of-service can be provided or not to the requesting downstream entity.

In case the latter message indicates that the requested quality-of-service can not be provided, the network entity may transmit to the requesting downstream network entity a message indicating that the requested quality-of-service can be provided, as soon as the quality-of-service constraints obtained from the quality-of-management function indicate that the requested quality-of-service can be provided.

In a variation of this embodiment, the requesting downstream network entity is not allowed to transmit a request to upgrade or downgrade the quality-of-service which is corresponding to the request for which the message indicating that the requested quality-of-service can not be provided has been received. Thereby, oscillation due to repeatedly transmitting upgrade/downgrade requests and repeatedly rejecting the requests may be prevented.

For example these oscillations may occur when users try one after another to join a service in a cell. Assuming that for the first user, the RNC may receive a negative response on its request to provide the service to the requesting user. According to the proposed mechanism the RNC would not forward any requests for the same service from the other user within the cell until a "notification" from upstream node indicates that the initially rejected service request is now granted. The solution proposed by this variation is more stateful since the upstream node and downstream node may remember what they last did.

Thus, according to an embodiment of the present invention a stateful solution as described above and a stateless solution, i.e. sending a request for each user may be supported.

In order to support different encodings of the service, another embodiment of the present invention foresees receiving information on the stream type indicating whether the packet streams forming the multiplexed packet stream are layered, alternative or complementary packet streams at the network entity and storing the stream type information in the context.

As already indicated above, status information on each packet stream of the multiplexed packet stream indicating whether the respective packet stream is forwarded by the network entity or not may be maintained by the network entity. One possibility to maintain this information may be storing same in the network entity's context.

According to another embodiment of the invention, the plurality of packet streams forming the multiplexed packet stream are layered packet streams having individual priorities and the multiplexed packet stream comprises a basic packet stream providing a basic quality-of-service and at least one enhancement packet stream enhancing the quality-of-service provided by the basic packet stream.

In another embodiment of the invention, the packet streams of the plurality of packet streams forming the multiplexed packet stream are alternative packet streams having the same priority and individual quality-of-service attributes.

According to a variation of this embodiment, the network entity may receive information on the default packet stream or the default combination of packet streams of the plurality of packet streams and may store this information in the context.

In a further variation, the network entity may receive information on the alternative combinations of packet streams of the plurality of packet streams and may store this information in the context.

According to even a further embodiment of the present invention, the packet streams of the plurality of packet streams forming the multiplexed packet stream are complementary packet streams having the same priority and belonging to one media type.

In another embodiment the quality-of-service management function provides the quality-of-service constraints for each interface of the network entity and the network entity performs a separate selection of packet streams for forwarding is performed for each interface.

In a further embodiment, the network entity may convert at least one selected stream to a stream transmittable within the quality-of-service constraints obtained from the quality-of-service management function. Thus, for example in situations in which none of the streams received by the network entity may be transmitted downstream within the quality-of-service constraints, the network entity may adapt one or more of the selected stream(s) to match the quality-of-service constraints downstream. The conversion may include at least one of converting the codec type, the spatial or temporal resolution, and from multiple-layered to single-layered streams and from constant bitrate to variable bitrate streams or vice versa According to another embodiment of the present invention the received information on the required quality-of-service attributes of the multiplexed packet stream indicates at least one of the maximum, the guaranteed bandwidth of each of the packet streams, the delivery order of service data units, the maximum size of service data units, the service data unit format, the service data unit error ratio, the residual bit error ratio; an indication whether erroneous service data units should be delivered or discarded, a transfer delay parameter, traffic handling priority of the bearer service, and the Allocation/Retention Priority of the radio bearer service.

Further, an embodiment of the present invention provides a network entity for filtering a multiplexed packet stream. The network entity may be part of the core network or the radio access network of a mobile communication system. The multiplexed packet stream provides a multicast or broadcast service and being delivered from a service center via the network entity to the mobile terminal. The network entity may comprise a service manager providing a quality of service function, and receiving means for receiving a broadcast or multicast service via a single bearer service, wherein the multicast or broadcast service is received in form of a multiplexed packet stream comprising a plurality of packet streams each being associated to quality-of-service attributes.

The receiving means may be further adapted to receive information indicating the quality-of-service attributes of each of the plurality of packet streams or of combinations of packet streams of the multiplexed packet stream. Moreover, the network entity may comprise communication means for obtaining from the quality of service function of the service manager quality-of-service constraints indicating a quality-of-service available for downstream data transmission, processing means for selecting those packet streams of the plurality of packets streams that can be provided to the mobile terminal within the obtained quality-of-service constraints, wherein the processing means is adapted to base the selection on the received quality-of-service attributes of the packet streams of the multiplexed packet stream, and transmitting means for forwarding the selected packet streams of the multiplexed packet stream providing the multicast or broadcast service to the mobile terminal.

In a variation of this embodiment, the network entity may further comprise means adapted to perform filtering method according to the various embodiments outlined above. For example, the network entity may further comprise a Demultiplexer for demultiplexing individual streams from the multiplexed stream and a multiplexer to form a new multiplexed stream forwarded downstream based on the selected streams.

Moreover, the present invention according to another embodiment provides a mobile communication system comprising a service center, at least one mobile terminal receiving multicast or broadcast service in form of a multiplexed data stream, and at least one network entity described above.

Further, another embodiment of the invention provides a computer readable medium for storing instructions that, when executed by a processor, cause the processor to filter a multiplexed packet stream in a network entity of the core network or the radio access network of a mobile communication system. The multiplexed packet stream may provide a multicast or broadcast service and may be delivered from a service center via the network entity to a mobile terminal comprising a service manager providing a quality-of-service management function.

The processor may be caused to filter a multiplexed packet stream by receiving a broadcast or multicast service via a single bearer service, wherein the multicast or broadcast service is received in form of a multiplexed packet stream comprising a plurality of packet streams each being associated to quality-of-service attributes, receiving information indicating the quality-of-service attributes of each of the plurality of packet streams or of combinations of packet streams of the multiplexed packet stream, obtaining from the quality-of-service management function quality-of-service constraints indicating a quality-of-service available for downstream data transmission, selecting those packet streams of the plurality of packets streams that can be provided to the mobile terminal within the obtained quality-of-service constraints, wherein the selection is based on the received quality-of-service attributes of the packet streams of the multiplexed packet stream, and forwarding the selected packet streams of the multiplexed packet stream providing the multicast or broadcast service to the mobile terminal.

Further, in a variation of this embodiment, the computer readable medium may further storing instructions that, when executed on a processor, cause the processor to perform the steps of the filtering method according to one the various embodiments described above.

BRIEF DESCRIPTION OF THE FIGURES

In the following the present invention is described in more detail in reference to the attached figures and drawings. Similar or corresponding details in the figures are marked with the same reference numerals.

FIGS. 2, 3 and 4 show an adaption node (e.g. RNC) filtering alternative, optional and layered packet streams, respectively, according to different embodiments of the invention.

DETAILED DESCRIPTION OF THE INVENTION

Figure 1:
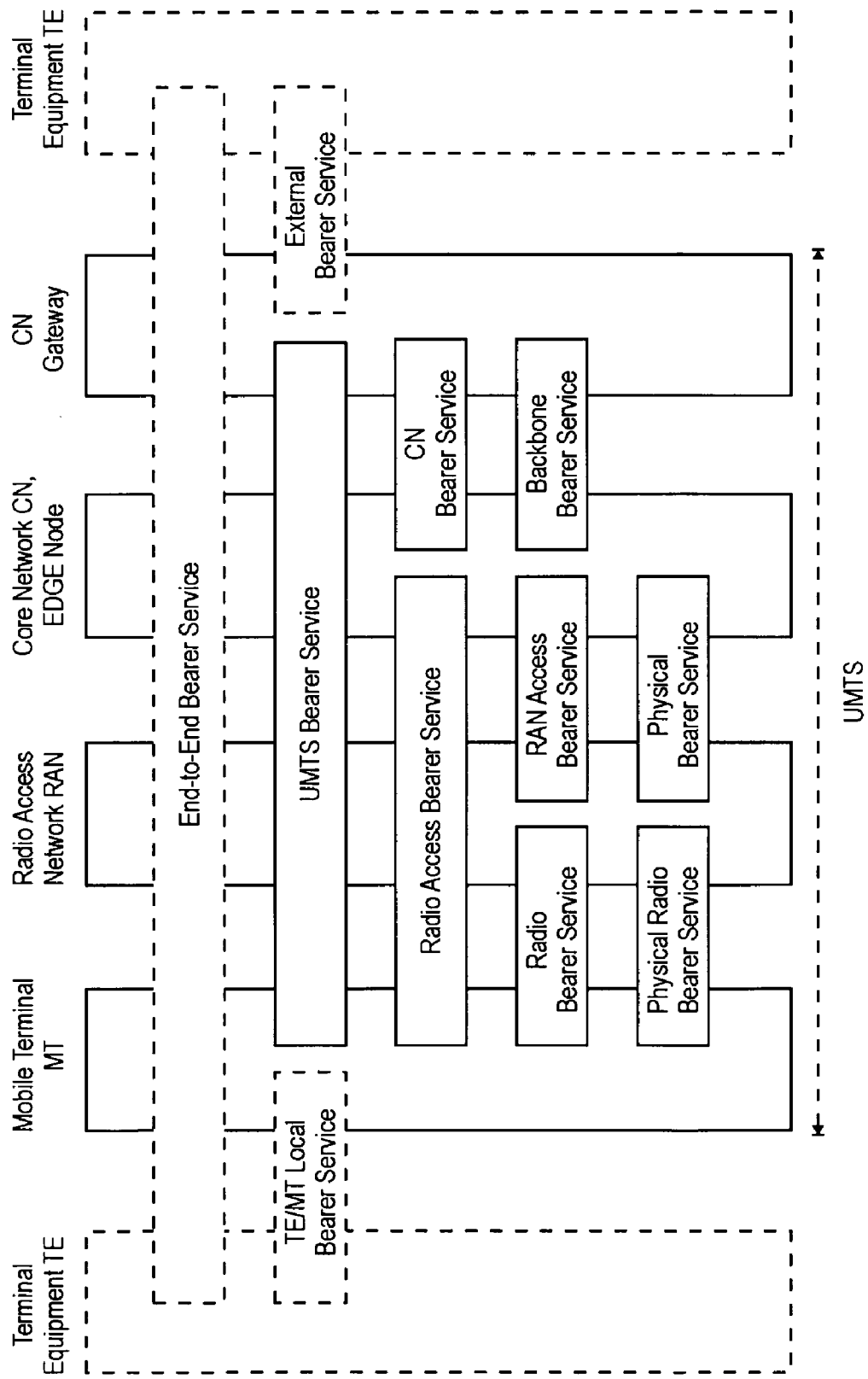
FIG. 1 shows an overview of the QoS architecture of UMTS.

The following paragraphs will describe various embodiments of the present invention. For exemplary purposes only, most of the embodiments are outlined in relation to a UMTS communication system and the terminology used in the subsequent sections mainly relates to the UMTS terminology. However, the used terminology and the description of the embodiments with respect to a UMTS architecture is not intended to limit the principles and ideas of the present inventions to such systems.

Also the detailed explanations given in the Technical Background section above are merely intended to better understand the mostly UMTS specific exemplary embodiments described in the following and should not be understood as limiting the present invention to the described specific implementations of processes and functions in the mobile communication network.

It is further noted that the present invention is mainly described with respect to bandwidth requirements and the respective to QoS adaptation. However, QoS differentiation and adaptation might also be applied to any other QoS parameter, e.g., as exemplified with the loss rate, or a combination of parameters.

Design Aspects for an Enhanced Multicast/Broadcast Service Architecture

The following aspects may be taken into account when designing a multicast/broadcast service architecture solving the above stated object of the present invention.

The MBMS architecture specified in 3GPP TS 22.246: "Multimedia Broadcast/Multicast (MBMS) user service; Stage 1 (Release 6)" (version 6.4.0, March 2004) and 3GPP TS 23.246: "Multimedia Broadcast/Multicast (MBMS); Architecture and functional description (Release 6)" (version 6.1.0, December 2003) is in an advanced stage. In order to be considered for fast and widespread deployment, an enhanced multicast/broadcast service architecture may follow the architectural specifications and only differ from these if reasonable. Thus, the negotiation of QoS between network nodes may be avoided and the resulting overhead regarding signaling and filtering may be kept as low as possible.

Further, another aspect when designing an enhanced multicast/broadcast service architecture is to cover a wide range of possibilities for content adaptation. For example available adaptive media codecs may be covered and a framework for future extensions may be provided.

One possible approach to overcome the limitations of the current MBMS architecture may be the use of adaptive media codecs. Examples of adaptive media codecs are layered codecs such as MPEG2 or MPEG4. These codecs typically encode media information in (at least) two or more layers, whereby the lowest layer is the most important layer. Following (higher) layers depend on previous (lower) ones.

Content may also be encoded in several independent representations, e.g., using an MPEG-1 encoder that allows providing alternative streams having differing bandwidth requirements or differing error resilience.

Another example of adaptive media codecs is the family of multiple description codecs (MDC). In this type of coding, the content is encoded in several complementary layers, i.e., the concepts of basic layer and dependency on previous layers disappears. In particular the higher the number of MDC-encoded packets received, the higher the quality obtained.

A further design consideration may be the availability of Radio Access Network resources. As outlined previously, without loosing generality, the radio access network may be typically considered being the critical system where the establishment of transport bearers may represent a bottleneck due to scarce radio resources. Thus, an enhanced multicast/broadcast service architecture may consider adaptation functionality in the radio network controllers.

Due to mobility of the end nodes, distribution trees might change during an ongoing session. Consequently, an enhanced multicast/broadcast service architecture may allow for both, adaptation at the session start and during a session, e.g. at handovers.

Another possible design aspect for an enhanced multicast/broadcast service architecture is to provide an adaptation for changing conditions in network and radio components. MBMS data may be distributed to multiple users through a MBMS distribution tree that can go through many RNCs and many SGSNs.

Figure 5:
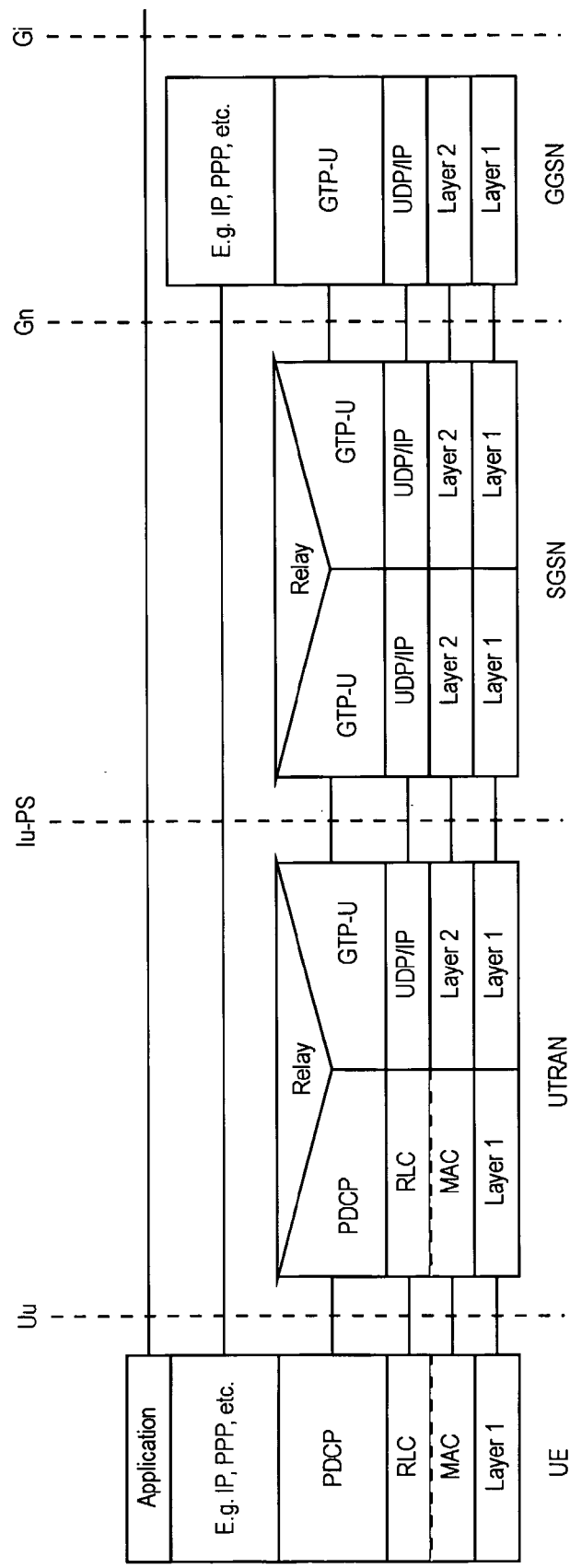
FIGS. 5 and 6 show the user plane protocol stack and the control plane protocol stack of the 3GPP MBMS architecture respectively.

Thereby, different media components comprising a single MBMS service from a users point of view may be provided over separate GTP (GPRS Tunneling Protocol) tunnels (GGSN<->SGSN, SGSN<->RNC—see FIG. 5) and radio bearers (RNC<->UE) enabling QoS differentiation for each component. An enhanced multicast/broadcast service architecture may therefore tackle QoS issues at both the radio access and the core network.

In order to realize a certain network QoS a Bearer Service (e.g. MBMS Bearer) with clearly defined characteristics and functionality may be set up from the source to the destination of a user service (e.g. multicast or broadcast service). A bearer service includes all aspects to enable the provision of a contracted QoS. These aspects are among others the control signaling, user plane transport and QoS management functionality. A UMTS bearer service layered QoS architecture is shown in FIG. 1. Each bearer service on a specific layer offers its individual services using services provided by the layers below.

The specific relations of the functions between the nodes (GGSN, SGSN, RNC, etc.) needed to specify, establish, modify and maintain a UMTS Bearer Service with a specific QoS may be implementation specific. This means that several technologies such as DiffServ, IntServ (see Braden et al., "Integrated Services in the Internet Architecture: an Overview", RFC1633, 1994), RSVP or MPLS may be used.

Considering the example of UMTS, the allocation of these functions to the UMTS entities means that these entities may enforce the QoS commitments negotiated for the UMTS bearer service. The specific realization of these functions may be implementation dependent and has only to maintain the specified QoS characteristics. The QoS management functions of all UMTS entities together may ensure the provision of the negotiated service between the access points of the UMTS bearer service.

Figure 15:
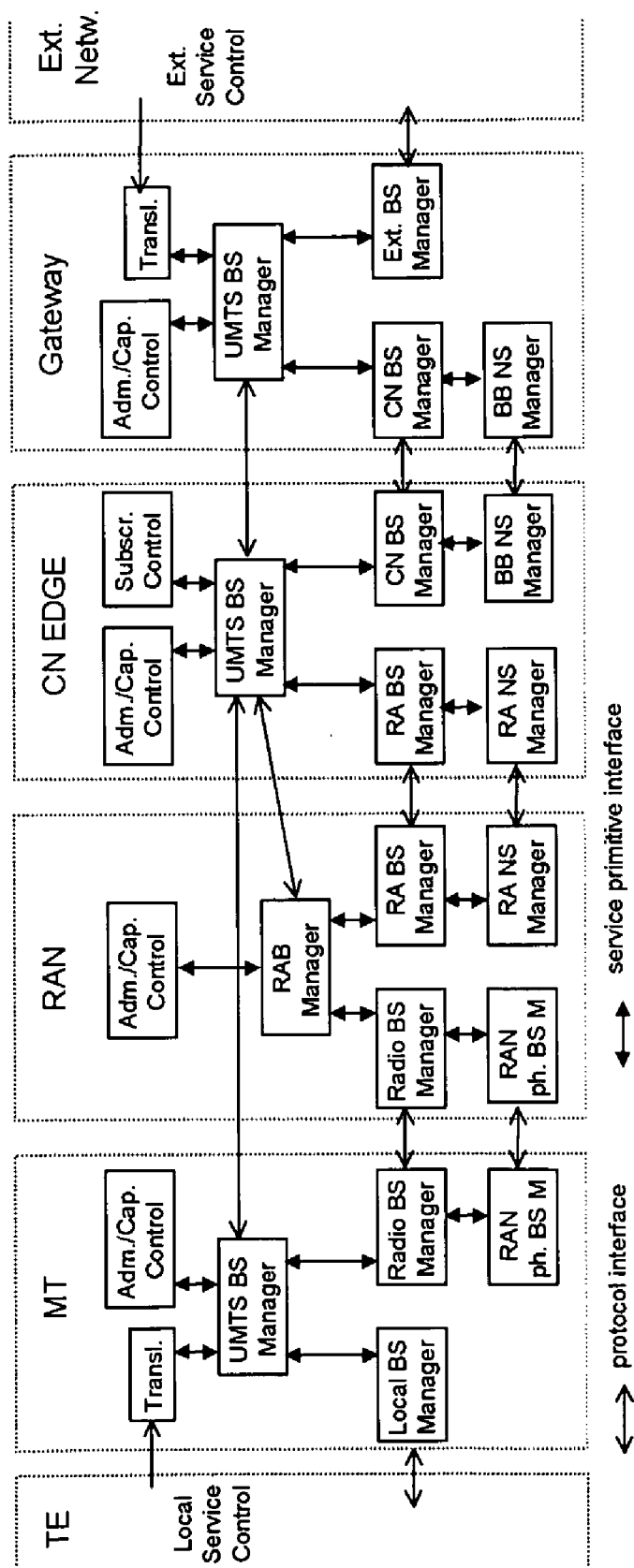
FIG. 15 shows QoS management functions for UMTS Bearer Service in the control plane.

For establishing a new enhanced multicast/broadcast service architecture, the functionality of the Service Manager as described in section 6.2.1.1 of 3GPP TS 23.107: "Technical Specification Group Services and System Aspects; Quality of Service (QoS) concept and architecture (Release 6)" (see version 6.1.0, March 2004) may be of particular interest. The service manager coordinates the functions of the control plane (e.g. MBMS Bearer Context, MBMS User Service Context) for establishing, modifying and maintaining the service it is responsible for (see FIG. 15). Further, it provides all user plane QoS management functions with the relevant attributes (e.g. guaranteed bitrate, maximum bitrate, maximum packet size, loss rate, etcetera).

The service manager may further offer services to other instances (e.g. MBMS Bearer Context management functions), may signal with peer service managers and may use services provided by other instances. The service manager may further perform an attribute translation (e.g. application packet loss rate to RLC SDU loss rate, SDU Loss rate to Layer 1/Layer 2 block error rate) to request lower layer services. Furthermore, it may interrogate other control functions to receive permission for service provision.

Therefore, it may be assumed that such an underlying infrastructure is provided and that the interaction between the MBMS Bearer and the QoS management functions is given. This allows that both network (CN) and radio access network conditions, which are inherently bound to vary due to the uncertainty about how users will make use of the available resources and other unforeseeable events are made known to the context management functions for the MBMS Service.

E.g. an illustrative example of the latter is the typical flash-crowd phenomena, where a particular server and associated network segment is overloaded by users requests. Another example may be the failure of some node on the path or the uncertainty about how many users will join unicast services like 3GPP PSS.

Another aspect when designing an enhanced multicast/broadcast service architecture may be the efficient use of network resources. Instead of establishing parallel distribution trees with different QoS values possibly having common nodes, the QoS architecture may allow to relay the largest possible amount of common data as far downstream as possible, thus reusing network bandwidth and resources. A typical scenario may the case of an RNC supporting different base stations with different available resources, e.g. different bitrates: in this case it is more sensible to forward all the supported media encoding rates in one (or several bearers) down to the RNC and let the RNC decide to which base station which content is forwarded.

Moreover, another aspect when designing an enhanced multicast/broadcast service architecture is to enable network-driven adaptation of the multicast/broadcast service. In the present MBMS architecture, the MBMS user will typically have little or no chance to negotiate the details of session delivery with the server (e.g. BM-SC). Here is where the network-driven adaptation becomes important.

Enhanced Multicast/Broadcast Service Architecture

According to one embodiment of the present invention the concepts of MBMS Transport Services and MBMS User Service are enhanced. An approach using a single Bearer Service (for example an MBMS Bearer) for providing a multicast or broadcast service (for example MBMS service) is considered. The QoS architecture is extended such that a differentiation of streams/bearers of a user service becomes possible at the network nodes (network entities). In this manner, network-driven adaptation to changing resources, heterogeneous terminals and different network components is possible using this information.

The timeline of an MBMS Service considered in the following for exemplary purposes only would be as follows: in the data plane, optional/alternative/complementary streams for the requested multimedia broadcast or multicast service are forwarded downstream in form of a multiplexed packet stream as long as the QoS requirements (constraints) are met by any of the intermediate network entities. If an intermediate node may not forward all packet streams belonging to the user service, it filters out streams in order to adapt the overall session stream to the available QoS. The relayed context information (i.e. within the Extended MBMS Bearer Context) enables network nodes to perform this filtering.

The context information may further allow the network to react to sudden capacity changes (up-/downgrades) because the nodes know the rest of options that would be available. The relayed context information describes the options for service configuration, i.e. the service semantics, and it may for example be stored in the MBMS Bearer Context. A further design possibility may be forwarding information on the state of dropped and not dropped streams downstream. Details will be provided in the following paragraphs.

Without loss of generality, the radio access network may be considered the bottleneck in the 3GPP architecture and the core network may be considered over-provisioned. It should be noted that the present invention is not to be limited to being applicable only under this assumption. Therefore filter entities (i.e. "adaptation nodes") may be exemplified in the RNCs, as depicted in FIGS. 2, 3 and 4, since the RNCs may have knowledge about the available resources in the own radio domain. This makes them adequate for this functionality. In this manner, the RNC acts as "adaptation node".

In general, any network entity in the RAN or CN may act as a filter entity. However, it may be feasible to select those entities as filtering entities that are aware of the resources on the links downstream towards the mobile terminal receiving the requested service.

The initialization of a filter at the adapting network entity may be triggered using control messages. Therefore, the service semantics may be signaled downstream to the corresponding RNC using the MBMS Procedures as explained below. Service semantics may be understood as to refer to information on the streams conveying the user service, their inter-relation, and their QoS profiles.

According to one embodiment of the present information these pieces of information reflecting the service semantics is provided within optional fields of the specified MBMS signaling messages. Furthermore, intermediate nodes such as GGSNs and SGSNs may not need to parse and process the values of the message extensions if they do not understand them. They may only forward them downstream.

According to another embodiment of the present invention the adaptive QoS concept outlined above further aims to allow services to support different paradigms for encoding a given content, e.g. layered, alternative or complementary. This is a novel approach for providing MBMS Services and, as such, it has not yet been reflected in the current architecture. Presently, only the placeholder for the signaling and management of the necessary MBMS Context information is defined but not how the different possibilities are implemented. The use of an Extended MBMS Bearer Context for storing the service semantics (e.g. information on streams belonging to a service, their inter-relation, their QoS profiles, etc.) is thus compatible with the current MBMS architecture.

Further, it should be noted that in the current MBMS architecture, the concept of streams is not clear, i.e., it is not specified whether for each QoS level a separate MBMS Bearer or a separate tunnel for the same MBMS Bearer is established. This issue, however, has in turn severe impact on the service announcement, service activation, and service context specification.

Extended MBMS Bearer Context

In the following an Extended MBMS Bearer Context according to an embodiment of the present invention maintained in the adaption nodes is described. The proposed context comprises additional information about the relation of streams and a list of their profiles is maintained in those network entities of the RAN and CN that understand the information: the so-called "adaptation nodes". Otherwise, a network node may ignore the extensions in order to ensure backwards-compatibility.

TABLE 1

Extended MBMS Bearer Context according to an embodiment of the present invention.

| Parameter | Description/Value |
| --- | --- |
| IP Multicast Address | IP Multicast Address identifying the MBMS bearer described by the context. |
| APN | Access Point Name on which the IP multicast address is defined. |
| TMGI | Temporary Mobile Group Identity allocated to the MBMS bearer service. |

TABLE 1-continued

Extended MBMS Bearer Context according to an embodiment of the present invention.

| Parameter | Description/Value |
|---|---|
| State | State of the bearer plane resources (e.g. "standby" or "active"). |
| Required MBMS Bearer Capabilities | QoS of the stream with lowest requirements. |
| QoS | QoS profile of the bearer. This field contains bearer QoS parameters such as maximum or guaranteed bandwidth. These pieces of information (in addition to the priority and the set of alternatives) may be used by the "adaptation node" to decide whether a bearer is pre-empted or added to the service. Further QoS attributes as needed by different relations between the streams might also be defined and included here. |
| MBMS Service Area | Area over which the MBMS bearer service is distributed. |
| List of Downstream Nodes | List of downstream nodes that have requested the MBMS bearer service and to which notifications and MBMS data have been forwarded. |
| Number of UEs | Number of UEs (User Equipments) hosted by the node that have joined the multicast MBMS bearer service. |
| Streams IE | Information element (IE) containing information on each stream and on how streams relate to one another. This is necessary for the filtering functionality (see details below). |

Each stream information element may comprise different fields dependent on the streams' inter-relation. For each exemplified type (layered, alternative and, complementary) the information element will be described below.

TABLE 2.1

Stream IE for Layered Streams

| Type of Streams | Each MBMS bearer contains multiple streams. This information element indicates how the streams are related to one another. E.g. streams may be layered, alternative or complementary. Layered streams may have different priorities and depend on each other. Alternative streams may have the same priorities but different QoS profiles: e.g. three different audio qualities. Complementary streams may have the also the same priorities and usually belong to the same media, e.g. multiple description codecs. |
|---|---|
| Stream List | This list contains a set of List Elements (as outlined below) describing the streams in the bearer. |

TABLE 2.2

Stream List IEs for layered streams

| Priority | The priority of the stream within the MBMS Bearer. |
|---|---|
| QoS Profile | QoS profile of the stream. This field contains bearer QoS parameters such as maximum or guaranteed bandwidth. These pieces of information (in addition to the priority and the set of alternatives) may be used by the "adaptation node" to decide whether a bearer is pre-empted or added to the service. Further QoS attributes as needed by different relations between the streams might also be defined and included here. |
| Transport Identifier | Identifier used for de-multiplexing purposes. (E.g., UDP port, encapsulated IP address, IP "TOS" field, DSCP, MPLS Label, etc.) |
| Forwarding State | List containing the Forwarding State of the stream (e.g., "forward" or "drop") for each downstream node. A network node may have several downstream nodes (e.g. several RNCs attached to an SGSN) to which the stream may or may not be forwarded. For each of the downstream node interfaces, the forwarding state of this stream is specified in this list. |

TABLE 3.1

Stream IEs for Alternative streams:

| Type of Streams | Whether streams are layered, alternative, complementary or other. Each MBMS bearer contains one or more streams. This is an information element indicating how the streams are related to one another. E.g. streams may be layered, alternative or complementary. Layered streams have different priorities and depend on each other. Alternative streams have the same priorities but different QoS profiles: e.g. three different audio qualities. Complementary streams have the also the same priorities and usually belong to the same media, e.g. multiple description codecs. |
|---|---|
| Stream List | This list contains a set of List Elements (as outlined below) describing the streams in the bearer. |
| Default Stream Combination | This field identifies the default stream or combination of streams e.g. by means of the transport identifier(s). |
| Alternative Stream Combinations | This field identifies a stream or combinations of streams e.g. by means of the transport identifier(s) being reasonable alternatives to the default option above. The alternative stream combinations might define, e.g., lower bandwidth stream combinations. Other combinations may, e.g., define combinations of the streams in a language different from that of the default option. Further, region-based combinations may be expressed to fit the stream combination to the region where the MBMS service is offered in, e.g. location based services. |

TABLE 3.2

Stream List IEs for alternative streams

| QoS Profile | QoS profile of the stream. This field contains bearer QoS parameters such as maximum or guaranteed bandwidth. These pieces of information (in addition to the priority and the set of alternatives) may be used by the "adaptation node" to decide whether a bearer is pre-empted or added to the service. Further QoS attributes as needed by different relations between the streams might also be defined and included here. |
|---|---|
| Transport Identifier | Identifier used for de-multiplexing purposes. (E.g., UDP port, encapsulated IP address, IP "TOS" field, DSCP, MPLS Label, etc.) |

TABLE 3.2-continued

Stream List IEs for alternative streams

| | |
|---|---|
| Forwarding State | List containing the Forwarding State of the stream (e.g., "forward" or "drop") for each downstream node. A network node may have several downstream nodes (e.g. several RNCs attached to an SGSN) to which the stream may or may not be forwarded. For each of the downstream node interfaces, the forwarding state of this stream is specified in this list. |

TABLE 4.1

Stream IE for complementary streams

| | |
|---|---|
| Type of Streams | Whether streams are layered, alternative, complementary or other. Each MBMS bearer contains one or more streams. This is an information element indicating how the streams are related to one another. E.g. streams may be layered, alternative or complementary. Layered streams have different priorities and depend on each other. Alternative streams have the same priorities but different QoS profiles: e.g. three different audio qualities. Complementary streams have the also the same priorities and usually belong to the same media, e.g. multiple description codecs. |
| Stream List | This list contains a set of List Elements (as outlined below) describing the streams in the bearer. |

TABLE 4.2

Stream List IEs for complementary streams

| | |
|---|---|
| QoS Profile | QoS profile of the stream. This field contains bearer QoS parameters such as maximum or guaranteed bandwidth. These pieces of information (in addition to the priority and the set of alternatives) may be used by the "adaptation node" to decide whether a bearer is pre-empted or added to the service. Further QoS attributes as needed by different relations between the streams might also be defined and included here. |
| Transport Identifier | Identifier used for de-multiplexing purposes. (E.g., UDP port, encapsulated IP address, IP "TOS" field, DSCP, MPLS Label, etc.) |
| Forwarding State | List containing the Forwarding State of the stream (e.g., "forward" or "drop") for each downstream node. A network node may have several downstream nodes (e.g. several RNCs attached to an SGSN) to which the stream may or may not be forwarded. For each of the downstream node interfaces, the forwarding state of this stream is specified in this list. |

Signaling of MBMS Bearer Context Extensions

Intermediate nodes within the distribution tree along which the streams of the service are provided to the user may relay stream information in the MBMS messages intended for the "adaptation node(s)".

For example, standard signaling protocols, such as the GPRS-based Tunneling Protocol (GTP-C) and RAN Application Part (RANAP) may be used to convey the information structures reflecting stream/bearer relations and properties of the MBMS Service. It is noted that other protocols may also be used to convey the MBMS Bearer Context extensions.

Figure 10:
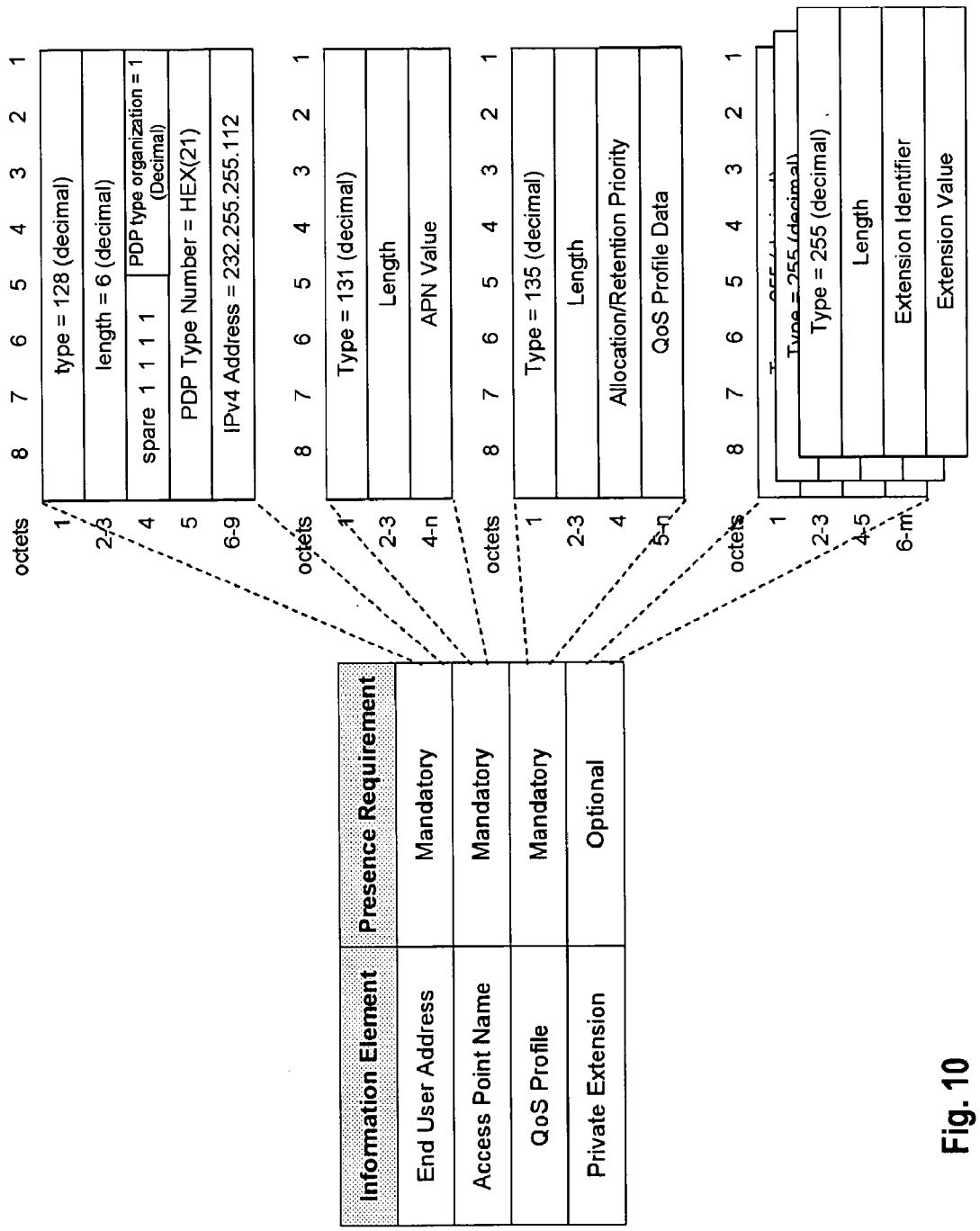
FIG. 10 shows a GTP-C MBMS Session Start Request message.

According to another embodiment of the present invention Private Extension Information Elements of the GTP-C message format may be used to convey the information structures. FIG. 10 exemplarily illustrates a GTP-C MBMS Session Start Request showing the Private Extension Field where these additional information pieces may be conveyed. Private Extension Information Elements are optional and typically used from operators or vendors for private information. Alternatively, also mandatory fields may be defined in protocol messages in order to convey the MBMS Bearer Context extensions.

In addition, the corresponding mappings of these pieces of information to the RANAP control messages may be defined in order to establish the MBMS Bearers and to carry out the MBMS Procedures, such as MBMS Session Start or MBMS Session Registration (see for example section 6 of TS 23.246 mentioned above).

Single-Bearer Approach

According to an embodiment of the present invention, a user service is provided using a single bearer, i.e. a single transport channel. For example, the user service may be provided using a single MBMS Bearer Service.

According to this embodiment, the following functional entities are introduced to the broadcast/multicast service architecture. The new architecture comprises at least one "adaptation node", which may implement a packet filter entity. This network entity of the RAN or CN may adapt the packet streams providing the user service via the transport channel of an associated radio bearer to the network constraints. According to another embodiment of the invention more than one adaptation node is provided within the distribution tree of the user service.

The adaptation nodes within the distribution tree of the user service may be provided with context information which includes stream information and stream inter-relations. This context information may for example be stored in form of an Extended MBMS Bearer Context as described above.

The proposed single-bearer approach allows having branches of a distribution tree with heterogeneous QoS, e.g. different base stations receiving different QoS of the user service. Further, it does not require any functionality implemented in the non-adaptive nodes. By implementing packet-level filters in the adaptation nodes and introducing additional MBMS Bearer Context information in the adaptation nodes a new service architecture may be provided having the above mentioned advantages over known architectures.

Data packets belonging to different streams are multiplexed onto the single transport channel, which is assigned a unique multicast group address. The multiplexed packets stream thus comprises a plurality of individual stream to provide a user service. A service center, for example a Broadcast/Multicast Service Center (BM-SC), may receive the streams by different means, e.g., from (third-party) content providers as encoded raw data (e.g., MPEG-2) or over several IP Multicast channels on the Internet.

The service center may choose several ways to perform data multiplexing, depending on the underlying service architecture. For example, the encoded streams may be encapsulated into RTP/UDP packets using different UDP port numbers. Next, the UDP data packets are multiplexed onto the IP multicast group address corresponding to the announced service (see FIG. 7). The service semantics describing the user service may indicate the port numbers of the individual streams provided via the transport channel.

This information may be stored in each adaptation node in form of a context comprising a description of the user service, including the service semantics, e.g. an Extended MBMS Bearer Context as outlined above. The information on the port numbers of the individual streams may be used by the adaptation node to demultiplex individual streams from the multiplexed data stream provided using the transport channel.

Alternatively, the IP TOS (Type of Service) Field of the IP header may be used for differentiating the individual streams. The service center may multiplex the data packets onto the multicast group address corresponding to the announced service, thereby mapping each original stream to a unique TOS field value in the Type of Service field. Thus, this approach uses the TOS field to provide means for service differentiation, i.e. providing a label allowing to the adaptation node to detect the different streams providing the user service (see FIG. 8).

Furthermore, it is also noted that other labels such as the DiffServ DSCP (DiffServ Code Point) or the MPLS labels (Multi-Protocol Label Switching) may also be used as multiplexing field, i.e. for differentiating individual streams of the user service when providing same via a single bearer.

As outlined above, the data packets may be differentiated in the "adaptation node" according to the employed multiplexing scheme, i.e., based on the port number, TOS field, etc.

If the service provides alternative (mutually exclusive) streams/groups of streams, the "adaptation node" may only forward only one of the alternative streams/one group of streams according to the current network conditions and according to the demultiplexing information received from the service center, which may be comprised in the context information. This context information may be used to establish the Extended MBMS Bearer Context outlined above. The conditions may be detected by each adaptation node's service manager.

If the service is provided in form of layered streams, the "adaptation node" may filter the streams such that the resulting compound stream does not violate the current network conditions and observes the stream dependency as expressed in the context information. The necessary context information regarding the stream type and de-multiplexing may be provided to the "adaptation node" from the service center and may be stored in the local MBMS Bearer Context (see Streams IEs in the tables above).

Operation

In the following an exemplary operation of the provision of an MBMS service is outlined with reference to the current MBMS standard (see TS 23.246) while changes to the procedures or the respective signaled information according to an embodiment of the present invention are described. After MBMS Session Activation and MBMS Registration Procedures, the standard MBMS Bearer Context is established in each intermediate node that is part of the distribution tree. The current MBMS Bearer Context reflects some properties of the transported data as well as bearer parameters. However, it does not provide enough information to enable a network node to perform MBMS Service adaptation as outlined above.

Thus according this embodiment of the invention, the MBMS Bearer Context stored in each adaptation node within the distribution tree is extended by introducing a new, additional entry as depicted in table 1 above.

The Streams Information Element (IE) provides information for demultiplexing of the streams and initialization of the filter entity in the "adaptation node". It may further include the type of the streams, e.g. layered, optional or complementary, the priority of the stream or the combination set where applicable, the assigned transport identifier, the QoS profile and the forwarding state for each downstream interface to a downstream node. Further QoS attributes as needed by different relations between the streams might also be defined.

It should be noted that for each stream a separate QoS profile, forwarding state identifier for each downstream interface and transport identifier(s) are stored in the context. According to a variation of this embodiment, the parameters defined in the QoS profiles for each stream within the Streams IE of the extended context correspond to those of the MBMS Bearer context, in the case each stream would be transported using a single bearer.

Furthermore, it should be noted that the "QoS" field of the Extended MBMS Bearer context as shown in table 1 above includes the quality-of-service required for the MBMS bearer service. If a bearer contains several streams the parameters in the "QoS" field may reflect the cumulative quality-of-service needed by all streams that are active. Thereby the proposed solution may be backwards compatible to the current architecture.

According to the MBMS architecture defined in TS 23.246, the MBMS UE Context is created in the UE and intermediate nodes as a result of the MBMS Service Activation message. Furthermore, the MBMS Bearer Context is created in the intermediate nodes as a result of the MBMS Registration procedure. The MBMS Registration message may be triggered next at the beginning of a session, when the first MBMS UE Context for a service is created and whenever a new downstream node is requesting the MBMS Bearer Context establishment during an ongoing session due to, e.g., new participants an ongoing session—or handovers of current participating terminals.

Figure 11:
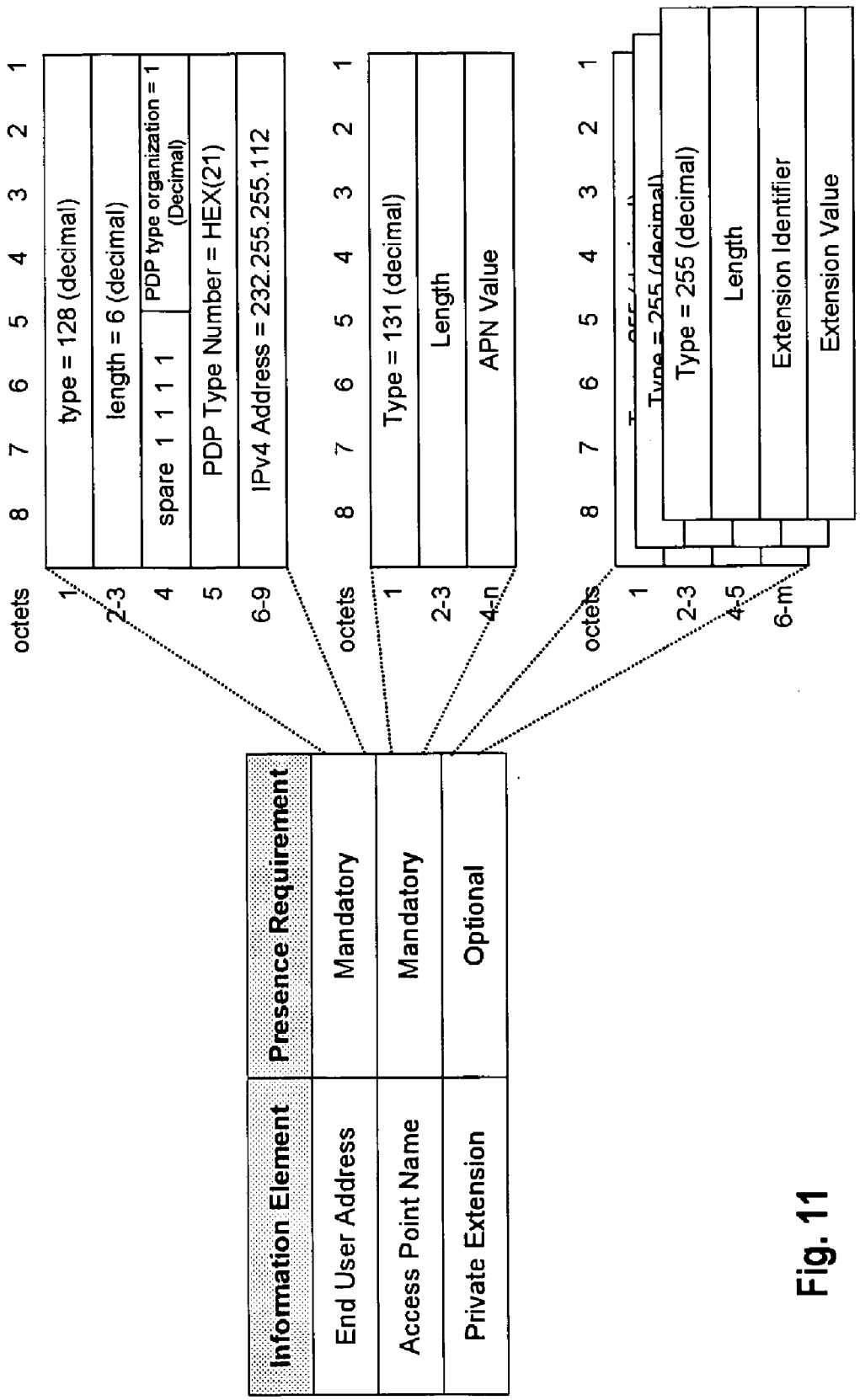
FIG. 11 shows a GTP-C MBMS Registration Request message.

According to the embodiment of the present invention, the "adaptation nodes" may signal their interest in receiving the service semantics allowing establishing the Extended MBMS Bearer Context at the respective adaptation nodes. The "adaptation nodes" may express interest in such information by using the Private Extension IE of the MBMS Registration Request as shown in FIG. 11, otherwise is the process not different from the standard Registration procedure. Alternatively to using the Private Extension IE of the MBMS Registration Request message, an additional mandatory field within this message may be defined. Another alternative may be to define new messages/procedures for the request and transport of service semantics. For simplicity, the use of the Private Extension IE is exemplified here.

It is further noted that according to a variation of the present embodiment, the service center may signal additional service semantics allowing the establishment of an Extended MBMS Bearer Context to all nodes of the distribution tree by default. In this case nodes that do not understand the service semantics may simply ignore same.

Figure 16:
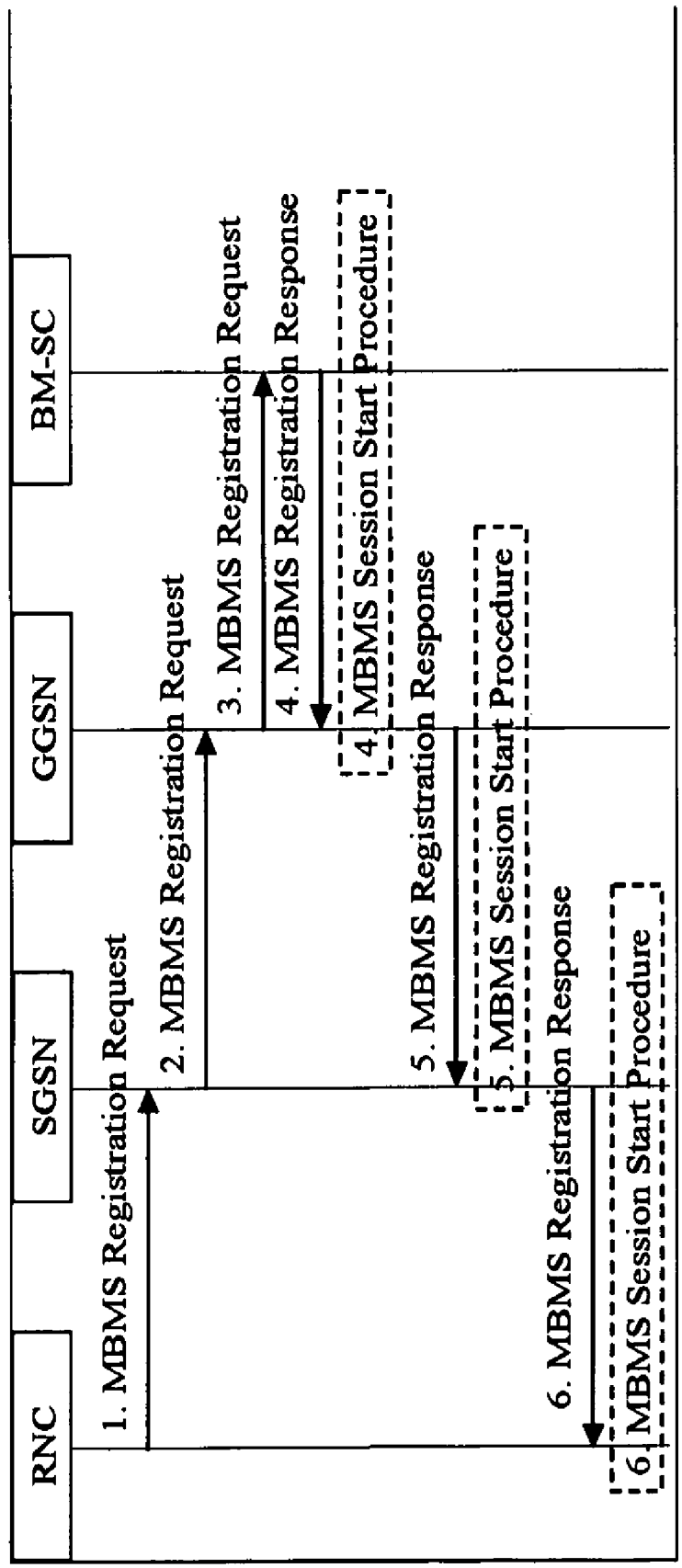
FIG. 16 shows an MBMS Registration procedure according to the MBMS standard.

The Registration procedure according to the MBMS standard is shown in FIG. 16. The dotted lines are intended to illustrate that an MBMS Session Start is triggered after the registration procedure if the MBMS Bearer Context is set to active. Note that, according to another embodiment it is possible that the Stream IE as per tables 2.1, 2.2, 3.1, 3.2, 4.1 and 4.2 above is sent in the Private Extension of the MBMS Registration Response during the MBMS Registration Procedure.

Alternatively another embodiment foresees that the Stream IE as per tables 2.1, 2.2, 3.1, 3.2, 4.1 and 4.2 may also communicated when performing the MBMS Session Start procedure. Following the MBMS Bearer Context establishment, the MBMS Session Start procedure is triggered by the BM-SC. According to this embodiment of the present embodiment, the MBMS Session Start Request may be in used to transport the actual QoS parameters for the MBMS Service, i.e. the "QoS" field as in table 1 and, if not already done during the MBMS Registration Procedure, the service semantics as shown in tables 2.1, 2.2, 3.1, 3.2, 4.1 and 4.2 above.

In general, the MBMS Start procedure (Request & Response messages) may also be used to establish the actual resources for the service (bearer plane), i.e. there is no actual reservation of resources until the MBMS Session Start procedure is triggered.

The standard MBMS Session Start Request and other MBMS control messages are defined within the GTP-C protocol specification (see 3GPP TS 29.060: "General Packet Radio Service (GPRS); GPRS Tunneling Protocol (GTP) across the Gn and Gp interface (Release 6)", version 6.4.0, March 2004). In the definition of these messages there are specified mandatory entries for the service end user address, the access point name, and the QoS profile, Furthermore, Private Extensions IE may be optionally provided allowing operators to signal additional control information to the network nodes.

According to an embodiment of the present invention extended context information—either the total or a part of the Streams IE contents (see tables 2.1, 2.2, 3.1, 3.2, 4.1 and 4.2)—is encapsulated into the Private Extension IE fields, as depicted in FIG. 10. Alternatively also mandatory extensions to these messages may be defined or existing IEs may be reused for conveying these information. Another alternative may be the definition of new messages and procedures for the purpose of conveying these pieces of information.

As outlined above Intermediate nodes along the distribution tree may not understand the provided optional information. In this case these nodes may relay the information in order to reach its destination, i.e., the "adaptation node".

Figure 6:
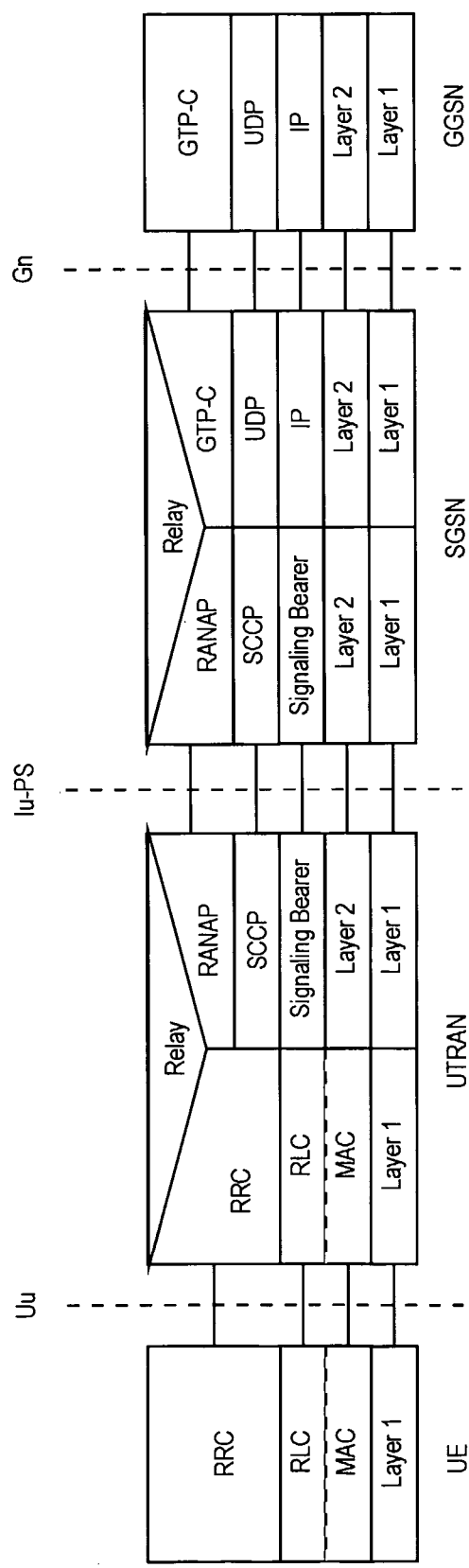

Furthermore it is noted that according to an embodiment of the present invention, the MBMS Session Start Request may be relayed down to the RNC(s) of the RAN. Similar messages as those used to relay the MBMS Session Start Request to with GTP-C between GGSN and SGSN in the core network (see FIG. 6) may be used for the communication between the SGSN and UTRAN (e.g. RNC). These new messages may be transmitted to the UTRAN using an extended RANAP protocol.

Assuming that the "adaptation node" has received the MBMS Session Start Request, it may parse the message and store the information comprised therein in an Extended MBMS Bearer Context. According to an embodiment of the present invention the adaptation node checks for the QoS profile of each stream and/or the possible combinations of streams.

If the user service is provided in form of alternative streams and the QoS constraints downstream provide that at least one of the streams is associated to QoS requirements which may be forwarded within the given downstream constraints, the adaptation node may reply with an MBMS Session Start Response "Request Accepted".

In case layered streams are used to provide the user service, an equivalent response may be sent, if the downstream QoS constraints allow at least the provision of the stream carrying the basic layer.

In the case of complementary streams, each stream is forwarded as long as the QoS constraints at each node allow it. A positive response is provided as longs as at least one of the streams is forwarded downstream.

Thus, in the above cases, the adaptation node may establish a downstream bearer with the best QoS level that can be supported, may update the Bearer state to "active", and may set the state of the streams appropriately, e.g., to forward or drop.

On the other hand, if the QoS check for each downstream interface of the node fails for each of the streams offered in the bearer, the MBMS Bearer is not established.

In another embodiment of the invention it is suggested that the adaption node may be further equipped with means allowing a conversion of packet streams, for example to match one or more streams of the service to the downstream QoS constraints. This may be for example applicable in situations where the QoS check for each downstream interface of the node fails for each of the streams offered in the bearer.

An overview of possible stream (or combination of streams) conversions is presented in "Video Transcoding Architectures and Techniques: An Overview" by A. Vetro et al., (IEEE Signal Processing Magazine, March 2003). Transcoding techniques may respond to different needs, e.g.:
1. codec conversion to switch between different codecs
2. temporal resolution or frame rate reduction,
3. reduction of the spatial resolution,
4. Constant Bit Rate to Variable Bit Rate conversion and
5. conversion of multiple layered streams to a single layer stream.

Applying a codec conversion may be appropriate when different architectures or proprietary networks interface, e.g., conversion of MPEG files to Windows proprietary WMA codec. Frame rate reduction may be useful for reducing the bitrate, while maintaining the quality of the encoded pictures and reducing the processing needs. A typical use case for frame rate reduction is a surveillance application, where a reduced rate keeping the picture resolution is an acceptable compromise in terms of storage capabilities.

The reduction of the spatial resolution may be useful when adapting the media to smaller devices, such as mobile terminals. A typical conversion is from MPEG-2 video (5.3 Mbps, 30 fps, 720×480) to MPEG-4 Simple Profile Level 2 (128 Kbps, 10 fps, 352×240).

The conversion of constant bitrate streams to variable bitrate streams is exemplified in M. Yong, Q. F. Zhu, and V. Eyuboglu, "VBR transport of CBR-encoded video over ATM networks," in Proc. 6th Int. Workshop Packet Video, Portland, Oreg., September 1994. The objective is to cope with constant bit rate streams in variable bit rate networks.

Furthermore, the conversion of multiple-layered streams, e.g. MPEG-4 FGS, to single-layer streams is another example of conversion that an adaptation node may carry out. This is exemplified in Y. C. Lin, C. N. Wang, T. Chiang, A. Vetro, and H. Sun, "Efficient FGS-to-single layer transcoding," in Proc. IEEE Int. Conf. Consumer Electronics, Los Angeles, Calif., June 2002, pp. 134-135.

According to a previous embodiment of the invention, even if an RNC is the only "adaptation node" within the distribution tree, it receives all streams belonging to the service (see FIG. 12) although it may only forward some of these streams towards the service-receiving UE.

In contrast thereto, another embodiment according to the invention foresees that the RNC receive only a subset of the streams, i.e. only the supported streams by its downstream nodes (e.g. base stations). This implies that the next upstream node, for example the SGSN also acts as "adaptation node" in order to drop the unnecessary streams before the RNC.

Figure 13:
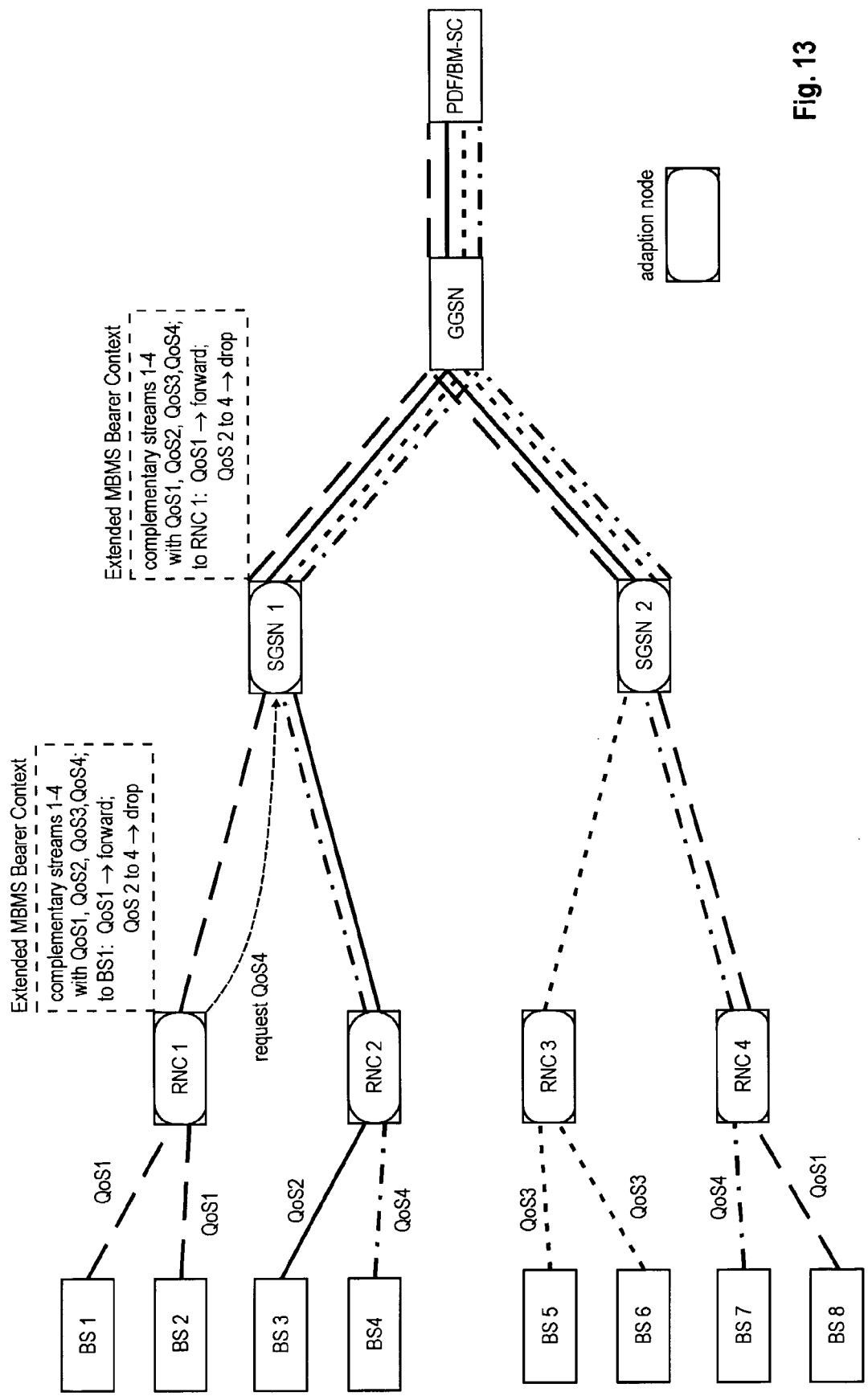
FIGS. 13 and 14 show a distribution tree of single bearer QoS architecture according to an embodiment of the invention before and after performing an adaption to changing network resources.
Figure 14:
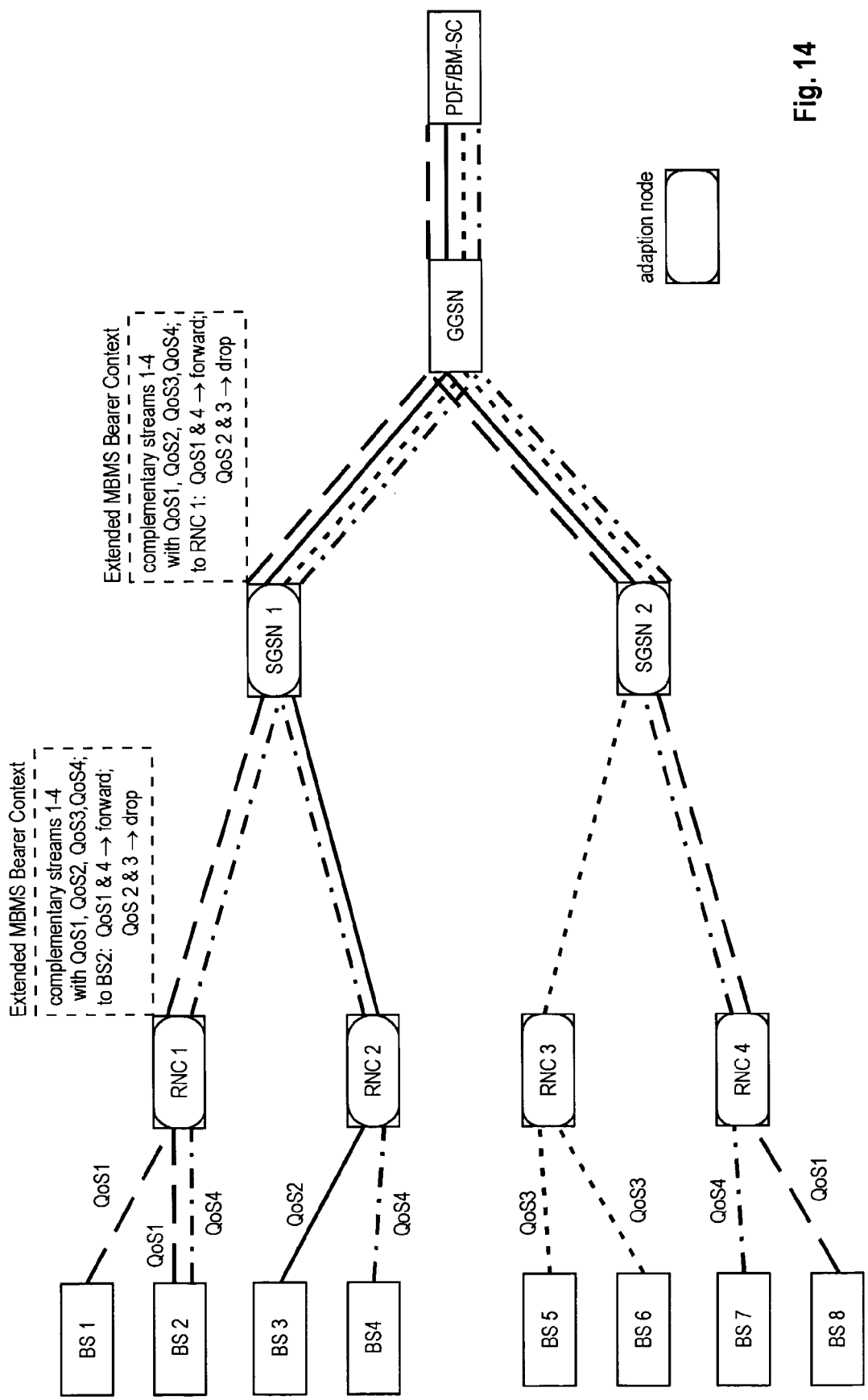

An example for further enhancing the broadcast/multicast service architecture according to a further embodiment of the present invention is illustrated in FIGS. 13 and 14. In FIGS. 13 and 14 both RNCs and SGSNs are "adaptation nodes". In the example, only one base station is supporting the higher QoS and this information is correspondingly communicated to the upstream nodes, SGSNs and GGSN respectively, which may adapt the downstream network constraints in that same only forward supported streams to the downstream entities.

At the end of a successful MBMS Session Start procedure the data distribution tree including the necessary resources (QoS parameters) may be established. The multiplexed packet stream comprising the individual streams for providing the requested user service may be transparently transported downstream to the "adaptation node(s)" utilizing the user plane protocols of the underlying architecture, as e.g. GTP-U in the case of a GPRS-based network.

Once the data packets reach an "adaptation node" packets are demultiplexed based on the transport identifier used.

According to one embodiment of the present invention the adaptation node is located in a node controlling the radio resources, for example an RNC. The RNC in the 3GPP architecture may implement header compression of IP packets, in order to use radio resources more efficiently. Header compression may be implemented between the RNC and the UE by means of the Packet Data Convergence Protocol (PDCP).

Figure 7:
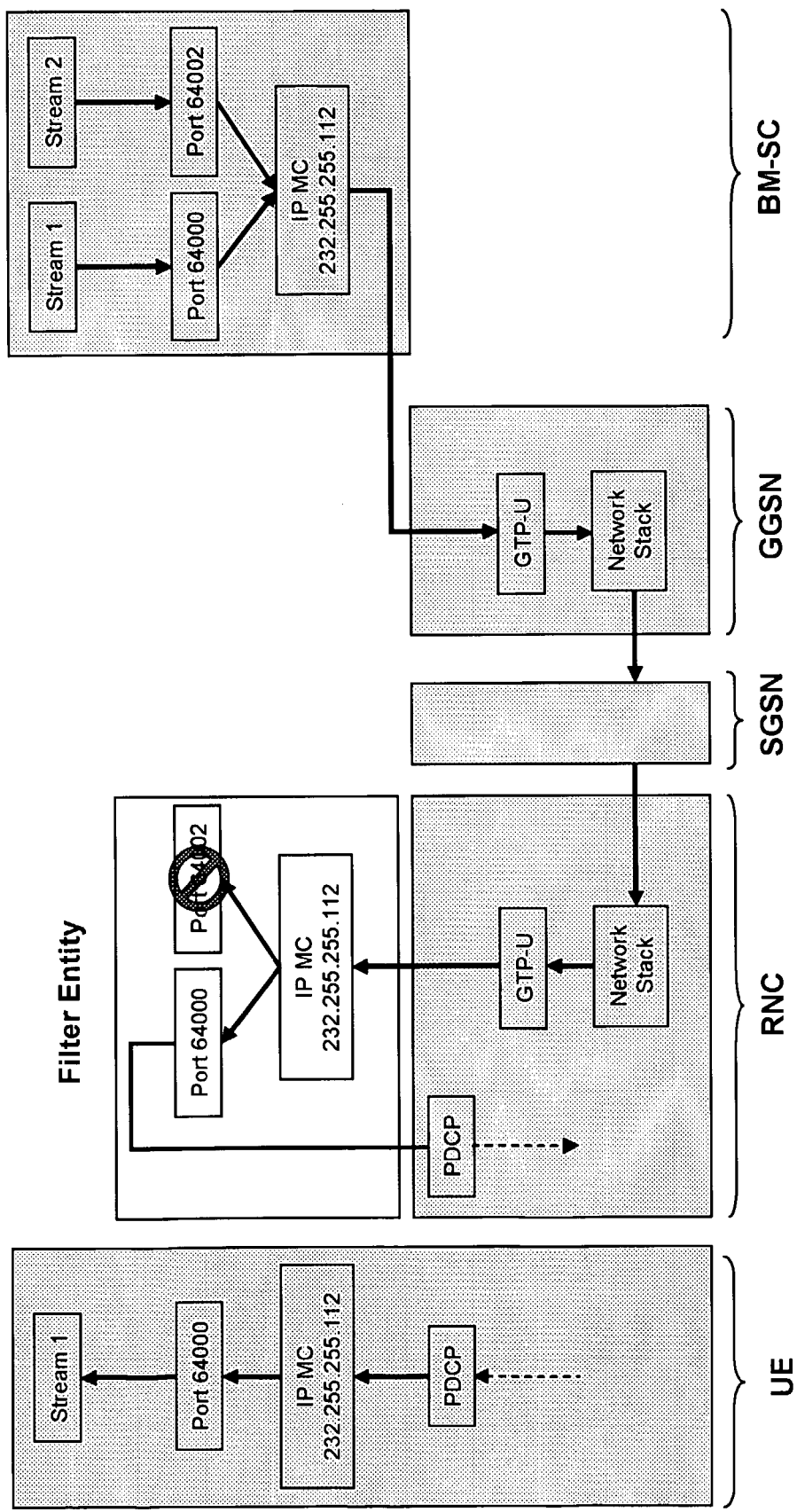
FIGS. 7 and 8 show an adaption node (e.g. RNC) filtering packet streams based on the UDP port number and TOS field of the IP Header, respectively, according to different embodiments of the invention.
Figure 8:
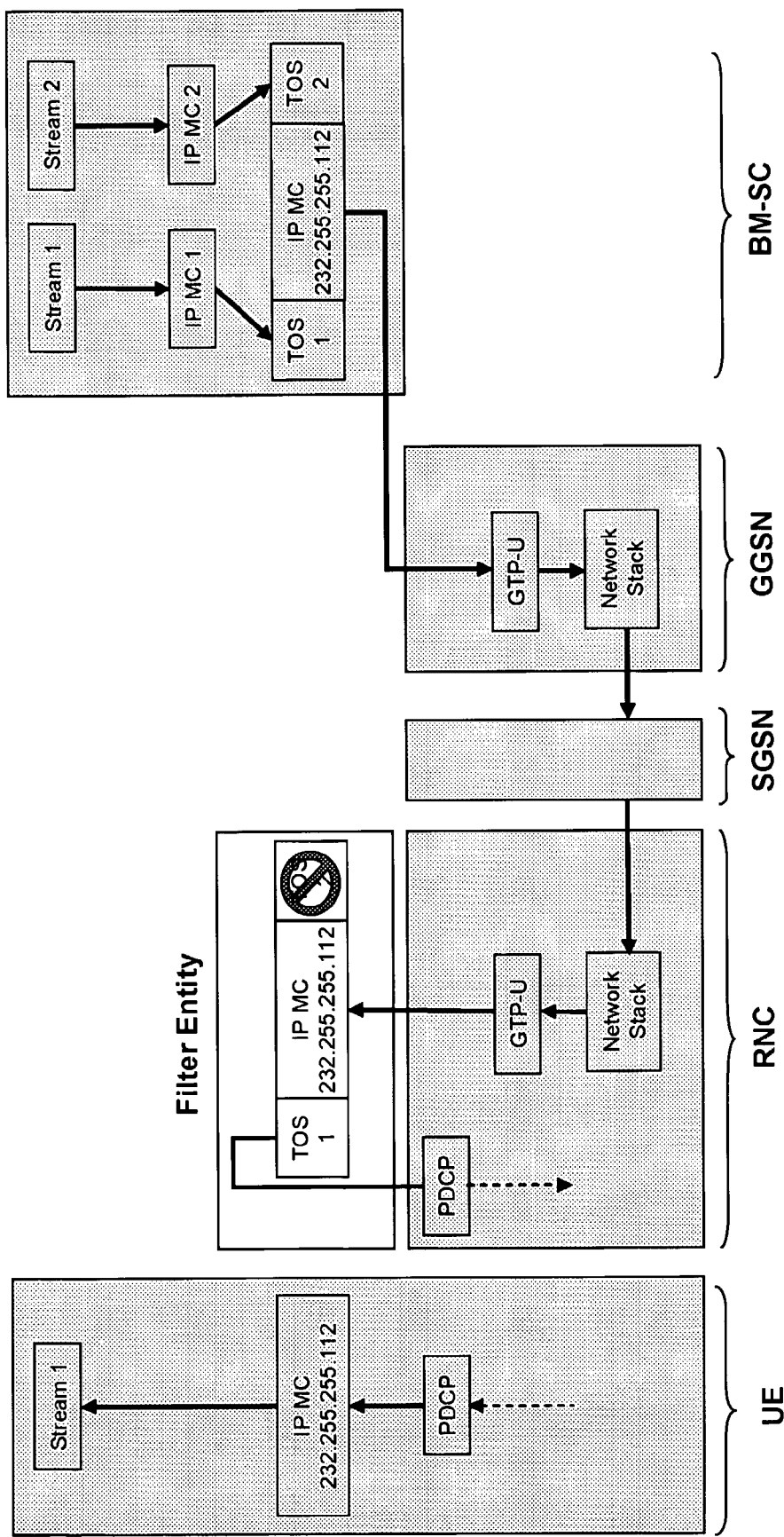

According to an embodiment of the present invention the, i.e. the network entity filtering the packet streams providing the user service may be an RNC located between the GTP-U termination endpoint and the PDCP instance as depicted in FIG. 7 and FIG. 8. Therefore, as the RNC may implement the PDCP, it may thus be provided with functionality to handle IP data packets and perform operations on their headers, such as header compression. Thus, the RNC may also be adapted to demultiplex the data packets from the transport channel providing the service, for example based on the UDP port number, the TOS field value of the IP header, etc. as outlined above.

During the transmission of service data, the adaptation node may inspect the header of each data packet of the corresponding transport bearer and perform packet forwarding and dropping according to the state information stored in the Extended MBMS Bearer Context.

To summarize the approach of service delivery via a single bearer a further exemplary embodiment of the present invention describes the provision of a MBMS Service comprising two layered streams will be described in the following. The layered stream comprises an audio stream with low bandwidth requirements (e.g., 8 kbps) and a video stream with moderate bandwidth requirements (56 kbps). The audio stream provides has a higher priority and can probably be provided to all users due to its low resource requirement. The video stream is optional and might be filtered if network conditions do not match the overall requirements. The user is subscribed to the user service for example by means of a MBMS Service Subscription procedure.

Step 1: Session Announcement.

The user receives or retrieves the session description, e.g., encoded in Session Description Protocol (SDP), encapsulated in Session Announcement Protocol (SAP), in an SMS message or posted in a website.

The following lines show an exemplary excerpt of a session announcement received by the user terminal. The comments following each code line explain the meaning of each code line.

| | |
|---|---|
| ✵ | |
| c=IN IP4 232.255.255.112 | // IP Multicast address allocated to the transport channel |
| m=audio 64000 RTP/AVP XY | // port number and application protocol of the audio stream |
| b=AS:8 | // required bandwidth for the audio stream |
| m=video 64002 RTP/AVP YZ | // port number and application protocol of the video stream |
| b=AS:56 | // required bandwidth for the video stream |
| ✵ | |

Step 2: Service Activation

Figure 9:
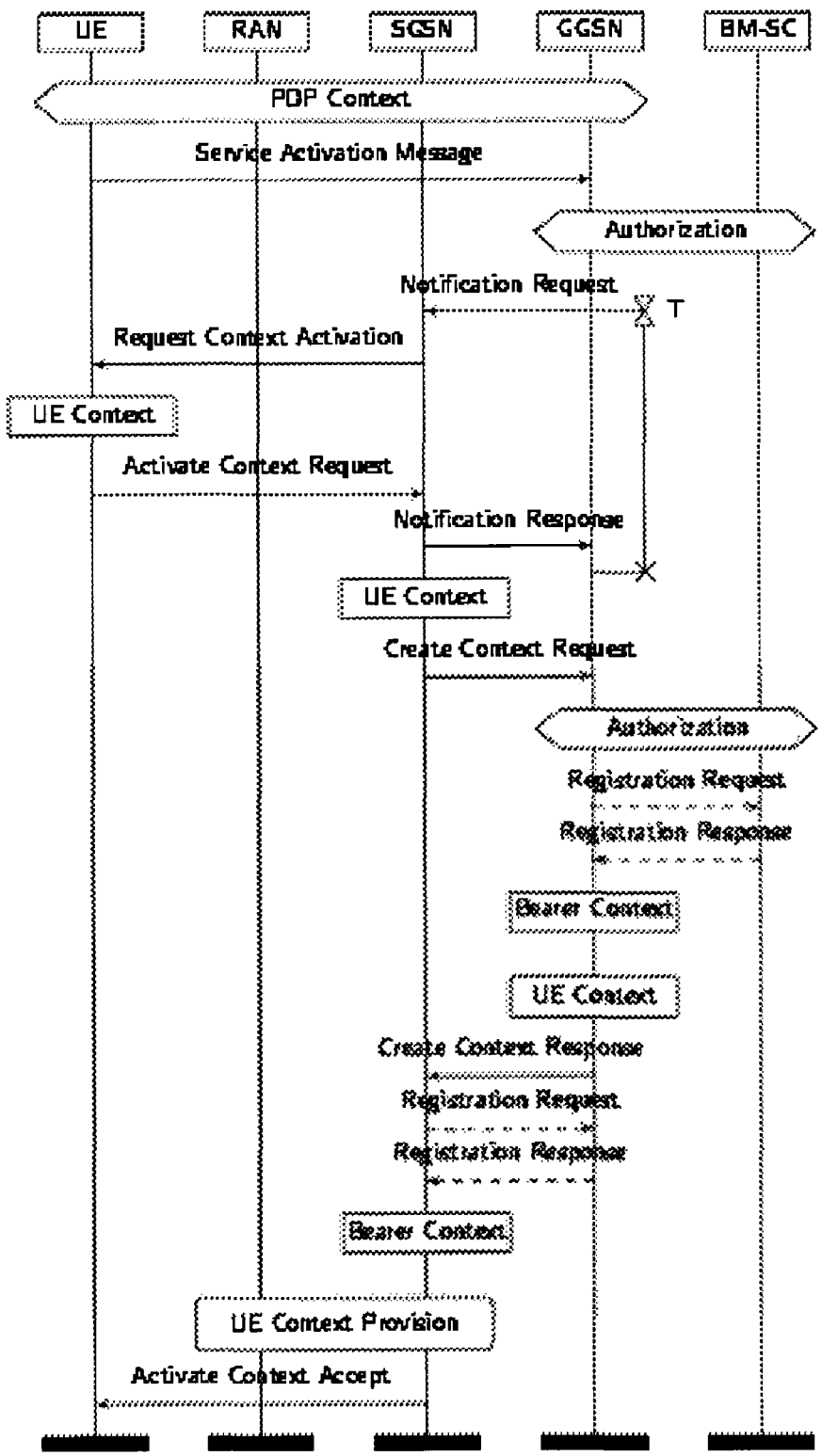
FIG. 9 shows a message sequence chart of an MBMS Activation Procedure.

The user performs a service activation using the IP Multicast address provided in the session announcement. As depicted in FIG. 9, the UE Context creation is triggered in the UE and network nodes, and if necessary the MBMS Registration procedure is triggered in order to provide the intermediate nodes along the distribution tree with the necessary Extended MBMS Bearer Context.

Step 3: Session Start

At session start or whenever a new node triggers the MBMS Registration procedure and the Extended MBMS Bearer Context is active during an ongoing session, an MBMS Session Start Request may be transmitted downstream. This message provides the nodes with the QoS requirements in order for nodes to be able to establish the distribution tree and allocate necessary resources.

According to this embodiment, the MBMS Bearer Context parameters, which are typically conveyed in the MBMS Session Start Request message, include additional stream information intended for the adaptation node. In the present example same may be: stream relation=optional; QoS profile of the audio stream (8 kbps, etc.), priority=1, transport identifier TOS=1; QoS profile of the video stream (56 kbps, etc.), priority=2, transport identifier TOS=2.

This information or a part of it may be conveyed in the Private Extension Field of the MBMS Session Start Request message as shown in FIG. 10. Additionally the bearer plane (actual resources) is reserved.

Note that, as explained above, the Stream IE containing the QoS profiles of each of the streams, their inter-relations, etc. may also be conveyed during the MBMS Registration procedure in the MBMS Registration Responses. In that case, the communication of the MBMS Bearer QoS profile and the actual reservation of resources may be still performed during the MBMS Session Start Procedure.

Furthermore, the "adaptation node" may check the two resulting QoS levels (audio, audio & video) and given that at least the audio stream can be forwarded, it may send to the next upstream node a positive MBMS Session Start Response. Furthermore, the adaptation node stores the additional bearer information into its Extended MBMS Bearer Context and sets the MBMS Bearer state to "active".

In the example it may be further assume that the second QoS level (audio & video) cannot be provided downstream of the adaptation node, so that the states of the audio and video streams in the Extended MBMS Bearer Context are set to "forward" and "drop", respectively.

Furthermore the adaptation node sets the packet filter according to stream forwarding states and the uses the transport identifier to filter out the data packets of the video stream (based on the TOS field value of the IP header), as long as the downstream QoS constraints do not allow its forwarding.

Step 4: Data Transport

Once a positive Session Start Response message reaches the BM-SC, it prepares the data if necessary and multiplexes the audio and video data packets onto the allocated IP Multicast channel (232.255.255.112). This procedure includes, e.g. setting the TOS field appropriately to "1" and "2" for each audio and video packet, respectively. In a variation of this embodiment, the TOS field values are set according to the priorities of the streams: e.g. the lower the TOS value, the higher the priority of the stream to which the packet belongs.

The two packet streams (audio & video) are forwarded along the distribution tree until they reach the "adaptation node". The "adaptation node" forwards the IP packets carrying the streams to its filtering entity, which discards all packets having the TOS field set to "2", as indicated by the State field value (e.g. "drop") of the extended context for the video stream. The other packets belonging to the audio stream are forwarded to the downstream nodes.

Dynamic Adaptation During MBMS Service—Handover and Change of Available Resources As seen above, the basics for dynamic adaptation are set, i.e. in the case of an upgrade or downgrade of the QoS that can be provided of any one of the downstream nodes, the "adaptation node" may handle such requests. Making use of the MBMS User Service Context, the "adaptation node" may decide which stream or which group of streams is activated/deactivated for a particular downstream node and may initiate the corresponding procedures. If an adaptation node receives an indication that the capacity on its interfaces has changed (e.g. increased) from the service manager and it receives a request from an adaptation node to upgrade downstream resources, the adaptation node may have the requested stream matching the upgraded capabilities available and may relay it to the requesting downstream adaption ode.

In case the stream matching the upgraded capacity is not available at the adaption node (e.g. has been filtered by another upstream adaption node) the adaption node may forward the request upstream, repeating the process in each upstream adaptation node (if present). This is explained in the following sections.

The adaptation of the MBMS Bearer may be defined as the process of upgrading, downgrading or in any way modifying the parameters of the MBMS User Service Context. Adaptation may be needed in several cases, for example: when a mobile terminal (UE) moves from one cell hosted by one RNC to another hosted by a different RNC, when a mobile terminal requests to receive the service in the middle of an ongoing MBMS Service or when the adaptation nodes realize that available resources have changed, for better or worse.

Two types of adaptation may be considered: first a static adaptation, which at the beginning of the service (during the MBMS Session Start procedure) and a dynamic adaptation, which takes place during the service, as mentioned above. Furthermore a general adaptation may be performed when there are one or several adaptation nodes in the network.

Figure 12:
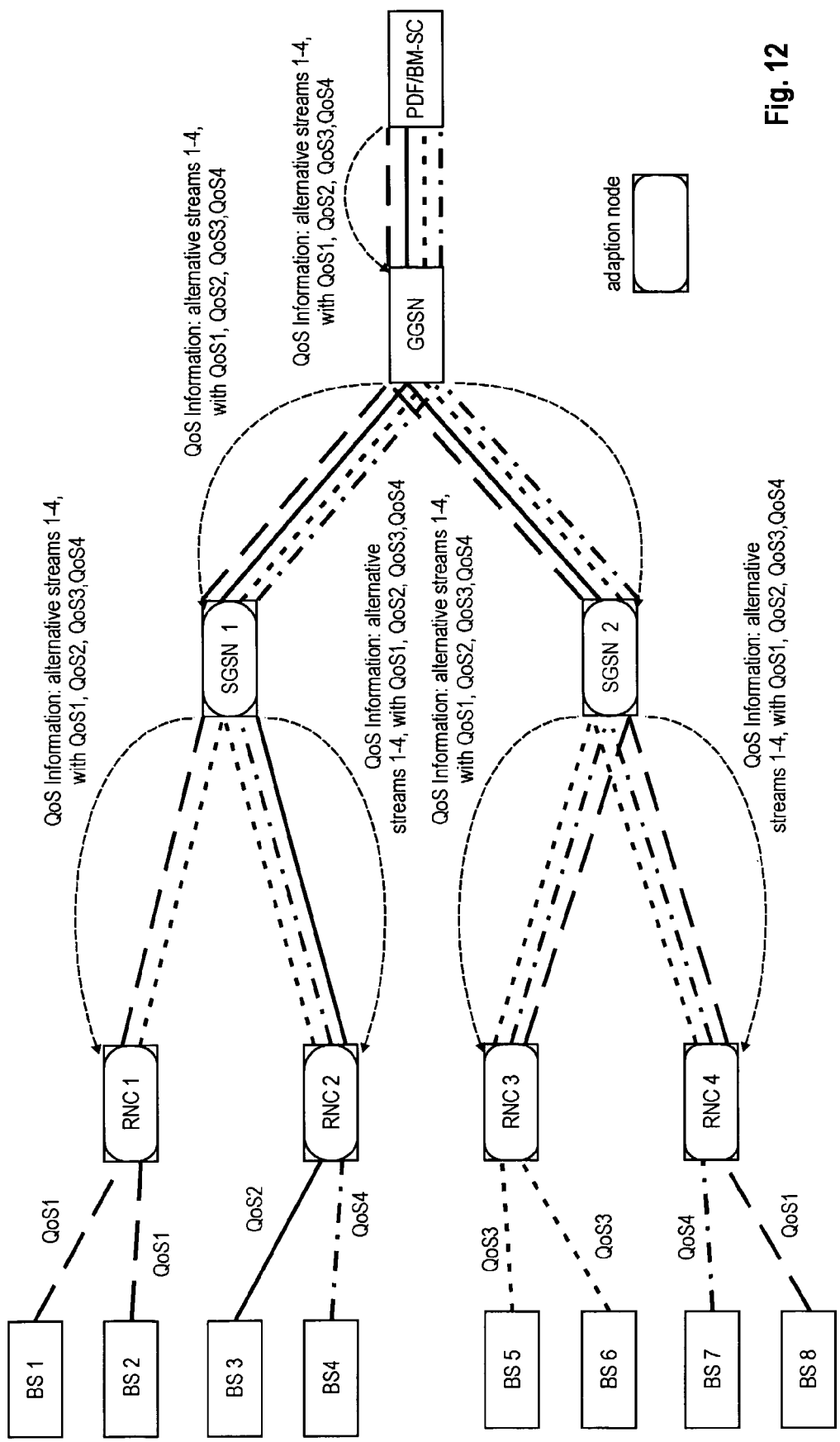
FIG. 12 shows a single bearer QoS architectures according to an embodiment of the invention.

FIG. 12 shows a QoS architecture according to an embodiment of the present invention. The RNCs and SGSNs of the network structure operate as adaptation nodes. The service is provided via a single bearer comprising four different streams with respective QoS requirements QoS1, QoS2, QoS3 and QoS4. These QoS requirements for the individual streams of the service as well as the stream inter-relation i.e. the information stat the four streams represent optional streams is provided from the service center to the downstream adaption nodes in the SGSNs and RNCs. All adaption nodes comprise a service manager, the QoS management function of which provides the QoS constraints of the interfaces towards the downstream nodes. For example the QoS management function of SGSN 1 may indicate the QoS constraints of the links to RNC 1 and RNC 2.

Using this QoS constraints provided by the QoS management function the adaptation nodes may select those streams which may be provided via the respective downstream interfaces to the next downstream nodes within these QoS constraints.

For example, considering SGSN 1 again, the QoS management function may indicate that for example on the interface to RNC 1 the resources are only sufficient to forward streams 1 and 3 with QoS 1 and QoS 3 respectively. On the interface to RNC 2 the resources allow forwarding streams 2, 3 and 4 (with QoS2, QoS3 and QoS4 respectively). Thus, SGSN 1 filters the multiplexed stream from GSGN to obtain the selected streams and forwards them to the next downstream nodes, here RNC 1 and RNC 2.

In the following the dynamic adaptation for the general case, where there is more than one adaptation node, e.g. RNC and SGSN is described.

In order to perform an adaptation of e.g. MBMS user services, the adaptation nodes may interface with a QoS management function provided in each adaptation node, i.e. the service manager as described above. A QoS management function is in charge of controlling, assigning and monitoring the resources available in a network being part of the radio access network or core network. Section 6.2 of 3GPP TS 23.107 gives details on the operation of such a framework.

Assuming that each adaptation node has access to QoS management functions each adaptation node can notice the change in capacity or availability of its network interfaces. Examples of these changes may be an increase or decrease of the number or capacity of the tunnels to be established to downstream or upstream nodes for providing MBMS services. Under this assumption a possible set of steps for performing adaptation during an ongoing session will be presented in the following.

In case of handover, i.e. a mobile terminal is moving to a new cell, its MBMS UE Context may be created in the new node/branch in the distribution tree resulting from the handover, if this context is not already present. Thus, if the upstream nodes of the new cell are not part of the distribution tree, the UE Context transfer may trigger MBMS Registration and Context creation as described in Step 2 above. The following Step 3 and Step 4, thus derive data transmission to the new branch.

In the case where the adaptation node detects (e.g. by means of signaling) that one or more of the downstream nodes have increased their capability and would like to receive an additional stream of the user service, the adaptation node may modify the current State of that stream within the Extended MBMS Bearer Context, may create an MBMS Registration Request with this updated state information and may forward same upstream to the next node. Thus, changes in the local Extended MBMS Bearer Context are propagated upstream by the respective adaptation node to allow a receiving upstream adaptation node to also update its context and filter settings accordingly if necessary.

If the required additional stream is not present at the adaptation node that detects the increased availability, but required additional stream is present at a node upstream of the adaptation node detecting the increased availability, the latter adaptation node may relay an MBMS Registration Request indicating the increased resources received from a downstream node. This message is relayed upstream until an upstream node capable of forwarding this requested additional stream is found. Otherwise, a negative message may be sent by the adaptation node, meaning that the stream is not available.

Similar considerations apply to downgrading of a service. An adaptation node may always drop the stream first and may then update its Extended MBMS Bearer Context and may propagate update information upstream using e.g. a MBMS Registration Request. A positive MBMS Registration Response received in response to the request may indicate that the stream was dropped by all upstream nodes.

If any of the upstream nodes receiving the request decides to keep the stream in the current forwarding state, it may return a negative response message to the request. In this case the stream is only dropped at those intermediate nodes downstream of that node along the distribution tree and including the originator of the MBMS Registration Request.

According to a further embodiment of the present invention the following messages may be used (i.e. instead of the overloaded or modified versions of the MBMS Registration and Session Start procedures as above) by an adaptation node to communicate changes to the network resources downstream. An MBMS Bearer Upgrade (Downgrade) Request and Response message is specified.

These messages may be exchanged by an adaptation node and an upstream adaptation node. The MBMS Bearer Upgrade (Downgrade) Request may be sent by adaptation nodes upstream when they detect either an upgrade (downgrade) of their downstream capabilities. The adaptation node may then compose a proposed new set of active (inactive) streams considering the current Extended MBMS Bearer Context.

1. Upon receiving an MBMS Bearer Upgrade (Downgrade) Request from downstream, each adaptation node receiving the message checks whether it may change its downstream capacity and forward (drop) the stream(s) indicated in the request. If the adaptation node may increase the downstream capacity and can forward the requested stream(s), it may transmit a positive MBMS Bearer Upgrade Response and provided the requested stream(s) downstream to the requesting adaptation node.
2. If the upstream adaptation node does not have the requested stream(s) but it has the capacity to allocate the downstream capacity, it may forward the MBMS Bearer Upgrade Request further upstream until an adaptation node capable of providing the requested stream(s) is reached (please note that this adaptation node may also be the BM-SC), in which case the behavior in item 1 above is repeated.
3. If the upstream adaptation node does not have the requested stream(s) and/or does not have the capacity to allocate the downstream capacity, an MBMS User Service Upgrade Response indicating the situation, e.g. by "Not Granted", is sent downstream.

An exemplary adaptation to changing resources on a link according to the embodiment of the invention is explained with reference to FIGS. 13 and 14. For simplicity only the Extended MBMS Bearer Contexts for RNC 1 and SGSN 1 are shown. In the initial state shown in FIG. 13, the RNC 1 determined that only stream 1 with QoS1 could be forwarded to BS 1 and BS 2 downstream within the QoS constraints obtained from the QoS management function.

This information has also been communicated to SGSN 1 which as a result already drops streams 2 to 4 as same are not further distributed downstream by the RNC 1. In the example it is assumed that the QoS management function in RNC 1 now indicates that the resources on the interface to BS 2 have increased significantly so that the RNC 1 may now forward streams 1 and 4 (with QoS1 and QoS4) to BS 2.

The RNC 1 determines that the stream 4 is already dropped upstream at SGSNS 1 since it is not received from SGSN 1 within the multiplexed packet stream providing the service. Therefore an upgrade request is transmitted from RNC 1 to SGSN 1 to request same to forward stream 4 (with QoS4) to the RNC 1.

Upon receiving the request, the SGSN 1 obtains the QoS constraints on the interface to RNC 1 from its QoS management function in order to determine whether sufficient resources are available to now forward stream 1 and 4 to RNC 1. If so, the SGSN 1 may do so and may update its Extended MBMS Bearer Context as shown in FIG. 14. Further, upon receiving a notification that the request is granted or upon detecting the presence of (new) stream 4 in the multiplexed packet stream received from the SGSN 1, the RNC 1 may also update its Extended MBMS Bearer Context and may forward streams 1 and 4 to the BS 2. This final state is shown in FIG. 14.

According to a further embodiment of the present invention, the originator of the MBMS Bearer Upgrade Request may only issue a new one request, when the upstream adaptation node that denied the request transmits a positive MBMS Bearer Upgrade Response to the same original request. This operation may be feasible to prevent oscillations of sending requests and negative responses. In order to allow the upstream nodes that initially denied the request to send a response message granting the update at a later time, same may store the request and may monitor whether the upgrade becomes possible due to changes in the resources available.

For dropping a stream or streams, i.e. performing a downgrade, the rationale is similar to the above outlined upgrade-case: the adaptation node may first drop the chosen stream(s) and may then send the MBMS Bearer Downgrade Request upstream. A positive answer indicates that all upstream nodes have dropped the stream(s), a negative that at least one has decided not to do so.

Adaptive and Scalable QoS Architecture for MBMS Broadcast Services

The previous embodiments above have described the QoS architecture for multicast services. In the following paragraphs the adaptation of this architecture will be described in order to address issues with respect to broadcast service delivery. The broadcast mode may be defined as a unidirectional point-to-multipoint transmission of multimedia data (e.g. text, audio, picture, video) from a single source entity to all users in a broadcast service area. The broadcast mode is intended to efficiently use radio/network resources e.g. data is transmitted over a common radio channel. Data is transmitted in the broadcast service area as defined by the network (Home environment).

In multicast/broadcast services, data transmission may adapt to different RAN capabilities or different radio resource availability, e.g. by reducing the bitrate of the MBMS data.

A broadcast service received by a mobile terminal may involve one or more successive broadcast sessions. A broadcast service may, for example, consist of a single on-going session (e.g. a media stream) or may involve several intermittent sessions over an extended period of time (e.g. messages).

It becomes apparent, how also Broadcast Services may need to adapt to varying network and radio conditions. In order to enable adaptation our proposed architecture described with respect to multicast services above is extended.

However, there is a fundamental difference between Multicast and Broadcast MBMS Services: there is neither subscription nor joining of interested mobile terminals in MBMS Broadcast Services. The Broadcast Session Start procedure may start independently of the mobile terminal's service activation, i.e. the Session Start may be the point in time at which the BM-SC is ready to send data. The Session Start may occur independently of Service Activation by the user—i.e. a given user may activate the service before or after the start of the session. The Session Start actually triggers for the establishment and reservation of bearer resources broadcast/multicast data transfer.

The user decides upon the activation of receiving a broadcast service. For example, the MBMS Broadcast service de-activation by the mobile terminal (UE) is local to same, i.e. may be performed without interaction with the UTRAN. Since for service activation at the terminal there is no interaction with the network required, there is also no MBMS Activation Procedure for MBMS Broadcast and thus no MBMS Registration Procedure.

The MBMS Bearer Contexts for MBMS Broadcast Services are created directly by the MBMS Broadcast Session Start Procedure. Therefore, in order to extend the architecture to the broadcast case, according to the present embodiment of the invention, the MBMS Broadcast Session Start message is extended in that the necessary information to generate the Extended MBMS Bearer Context described above (see tables 1, 2.1, 2.2, 3.1, 3.2, 4.1 and 4.2) are included in a modified MBMS Broadcast Session Start message.

As has become apparent from the above, due to the absence of an MBMS Registration Procedure when considering MBMS Broadcast, there is no possibility to use this procedure the for establishing an extended context at the adaptation node(s). Alternatively to using an extended MBMS Broadcast Session Start message, additional messages or procedures may also have to be defined to convey the necessary information for establishing the Extended MBMS Bearer Context at the adaptation node(s).

Otherwise the same adaptation capabilities apply to broadcast services as outlined above with reference to multicast services. Hence, according to this embodiment of the present invention, the principle of using an Extended MBMS Bearer Context within the adaptation node(s) and providing adaptation nodes with the necessary filtering capability in order to filter out the multiplexed packets streams provided via the transport channel of the single radio bearer also apply to broadcast services.

Scalable and Adaptive QoS Architecture in Evolved UTRAN

Future UTRAN architectures envision the provision of more intelligence (enhanced control & management functions) to be pushed further to the edges of the network, for example to the Node Bs (base stations). One reason to do this may be to eliminate the single point of failure that the RNC constitutes currently. It is be noted that this future UTRAN architecture might perfectly accommodate the adaptive QoS architecture according to the different embodiments described above.

For using the principles outlined above, the Extended MBMS Bearer Context may be correspondingly replicated in the new nodes, e.g. the Node B+s of the new UTRAN architecture. The proposed MBMS procedures may be extended accordingly. Other functionalities and requirements are similar to those outlined in sections above.

Another embodiment of the present invention relates to the implementation of the above described various embodiments using hardware and software. It is recognized that the various above mentioned methods as well as the various logical blocks, modules, circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for filtering in a network entity of a core network or a radio access network of a mobile communication system a multicast or broadcast service provided in the form of a multiplexed packet stream, the multiplexed packet stream being delivered from a service center via the network entity toward at least one mobile terminal, the method being performed by the network entity and comprising:

receiving the multicast or broadcast service via multicast or broadcast, wherein the multicast or broadcast service is multicast or broadcast as a single bearer service and the multiplexed packet stream comprises a plurality of packet streams each being associated to quality-of-service attributes, receiving from an upstream network entity context information of the multicast or broadcast service, the context information comprising information on the packet streams belonging to the multicast or broadcast service, the quality-of-service attributes of the packet streams belonging to the multicast or broadcast service, and, where applicable, combinations of the packet streams providing the multicast or broadcast service at different quality of service levels, obtaining from a quality-of-service management function of a service manager within the network entity quality-of-service constraints indicating a quality-of-service available for data transmission on each of a plurality of downstream interfaces of the network entity, selecting for a respective one of the downstream interfaces of the network entity one of the packet streams of the multicast or broadcast service or a combination of the packet streams of the multicast or broadcast service, transmittable downstream within the obtained quality-of-service constraints, wherein the selecting is based on the context information of the multicast or broadcast service received from the upstream network entity, and forwarding the selected packet stream or streams of the multiplexed packet stream downstream towards the at least one mobile terminal, wherein the received context information on the quality-of-service attributes of the multiplexed packet stream indicates at least one of a guaranteed bandwidth of each of the packet streams, a delivery order of service data units, a maximum size of service data units, a service data unit format, a service data unit error ratio, a residual bit error ratio, an indication whether erroneous service data units should be delivered or discarded, a transfer delay parameter, a traffic handling priority of the single bearer service, and an Allocation/Retention Priority of the single bearer service.

2. The method according to claim 1, wherein the received context information indicates quality of-service attributes of each of the plurality of packet streams belonging to the multicast or broadcast service and quality-of-service attributes of combinations of packet streams belonging to said multicast or broadcast service.

3. The method according to claim 1, wherein the network entity is an entity of the radio access network having quality-of-service management functionality or an entity of the core network having quality-of-service management functionality.

4. The method according to claim 1, further comprising receiving information indicating transport identifiers of the individual packet streams for demultiplexing the individual packet streams from the multiplexed packet stream providing the multicast or broadcast service.

5. The method according to claim 4, further comprising recognizing the individual packet streams of the received multiplexed data stream providing the multicast or broadcast service based on the transport identifiers.

6. The method according to claim 5, wherein the transport identifiers comprise one of UDP port numbers comprised in UDP packets of the packet streams, values set in a type of service field of an IP header comprised in IP packets delivering the packet streams, a DiffServ CodePoint value set in the IP header comprised in the IP packets delivering the packet streams or MPLS labels assigned to headers of the data packets transporting the packet streams of the multiplexed packet stream.

7. The method according to claim 4, wherein the forwarding of the selected packet stream or streams comprises multiplexing the selected packet stream or streams to a new multiplexed packet stream.

8. The method according to claim 1, further comprising forming a multicast or broadcast service related context comprising the received context information and the selected packet stream or streams of the service.

9. The method according to claim 8, wherein the selecting of the packet stream or streams for forwarding downstream is based on the context.

10. The method according to claim 8, further comprising:
monitoring available downstream resources at the network entity's interfaces using the quality-of-service management function of the network entity,
updating the context by selecting the packet stream or streams of the plurality of packets streams that can be provided to the mobile terminal within constraints implied by the monitored available downstream resources, and updating information in the context based on the selecting, in case a change in the monitored results has been monitored, and
transmitting information indicating the network entity's context to at least one upstream network entity, in case the network entity's context is updated.

11. The method according to claim 8, further comprising:
receiving information on a stream type indicating whether the packet streams forming the multiplexed packet stream are layered, alternative or complementary packet streams, and
storing the stream type information in the context.

12. The method according to claim 8, further comprising maintaining status information on each packet stream of the multiplexed packet stream indicating whether the respective packet stream is forwarded by the network entity or not.

13. The method according to claim 8, wherein:
the plurality of packet streams forming the multiplexed packet stream are layered packet streams having individual priorities, and
the multiplexed packet stream comprises a basic packet stream providing a basic quality-of-service and at least one enhancement packet stream enhancing the quality-of-service provided by the basic packet stream.

14. The method according to claim 8, wherein the packet streams of the plurality of packet streams forming the multiplexed packet stream are alternative packet streams having the same priority and individual quality-of-service attributes.

15. The method according to claim 14, further comprising receiving information on a default packet stream or a default combination of packet streams of the plurality of packet streams and storing the received information in the context.

16. The method according to claim 14, further comprising receiving information on alternative combinations of packet streams of the plurality of packet streams and storing the received information in the context.

17. The method according to claim 8, wherein the packet streams of the plurality of packet streams forming the multiplexed packet stream are complementary packet streams having the same priority and belonging to one media type.

18. The method according to claim 1, further comprising receiving information indicating at least one context from downstream network entities indicating a respective downstream quality-of-service that can be provided and updating the network entity's context based on the received information indicating the at least one context.

19. The method according to claim 1, further comprising:
receiving from a downstream entity a request to upgrade or downgrade a quality-of-service level provided for the multiplexed packet stream transporting the multicast or broadcast service, and
transmitting to the requesting downstream network entity a message indicating whether the requested quality-of-service can be provided or not.

20. The method according to claim 19, wherein:
the message indicates that the requested quality-of-service cannot be provided, and
wherein the method further comprises transmitting to the requesting downstream network entity a message indicating that the requested quality-of-service can be provided, as soon as the quality-of-service constraints obtained from the quality-of-management function indicate that the requested quality-of-service can be provided.

21. The method according to claim 20, wherein the requesting downstream network entity is not allowed to transmit another request to upgrade or downgrade the quality-of-service which corresponds to the request for which the message indicating that the requested quality-of-service cannot be provided has been received.

22. The method according to claim 1, wherein the quality-of-service management function provides the quality-of-service constraints for each interface of the network entity and a separate selection of packet streams for forwarding is performed for each interface.

23. The method according to claim 1, further comprising converting at least one of the selected streams to a stream transmittable within the quality-of-service constraints obtained from the quality-of-service management function.

24. The method according to claim 23, wherein the converting comprises at least one of converting a bit rate of the stream, converting a codec type, converting a spatial or temporal resolution, and converting from multiple-layered to single-layered streams and from constant bit rate to variable bit rate streams or vice versa.

25. The method according to claim 1, wherein the packet streams of the multicast or broadcast service are provided on one IP multicast channel.

26. A network entity for filtering a multicast or broadcast service provided in the form of a multiplexed packet stream, the network entity being part of a core network or a radio access network of a mobile communication system, and the multiplexed packet stream being delivered from a service center via the network entity towards at least one mobile terminal, the network entity comprising:
a service manager providing a quality of service function,
a receiving unit that receives the multicast or broadcast service via a multicast or broadcast, wherein the multicast or broadcast service is multicast or broadcast as a single bearer service and the multiplexed packet stream comprises a plurality of packet streams each being associated to quality-of-service attributes, wherein the receiving unit further receives from an upstream network entity context information of the multicast or broadcast service, the context information comprising information on the packet streams belonging to the multicast or broadcast service, the quality-of-service attributes of the packet streams belonging to the multicast or broadcast service and, where applicable, combinations of the packet streams providing the multicast or broadcast service at different quality-of-service levels, a communication unit that obtains from the quality of service function of the service manager quality-of-service constraints indicating a quality-of-service available for data transmission on each of a plurality of downstream interfaces of the network entity, a processing unit that selects for a respective downstream interface of the network entity one of the packet streams of the multicast or broadcast service or a combination of the packet streams of the multicast or broadcast service, transmittable downstream within the obtained quality-of-service constraints, wherein the selection is based on the context information of the multicast or broadcast service received from the upstream network entity, and a transmitting unit that forwards the selected packet stream or streams of the multiplexed packet stream downstream towards the at least one mobile terminal, wherein the received context information on the quality-of-service attributes of the multiplexed packet stream indicates at least one of a guaranteed bandwidth of each of the packet streams, a delivery order of service data units, a maximum size of service data units, a service data unit format, a service data unit error ratio, a residual bit error ratio, an indication whether erroneous service data units should be delivered or discarded, a transfer delay parameter, a traffic handling priority of the single bearer service, and an Allocation/Retention Priority of the single bearer service.

27. A mobile communication system comprising a service center, at least one mobile terminal receiving multicast or broadcast service in the form of a multiplexed data stream, and at least one network entity according to claim 26.

28. A non-transitory computer readable medium for storing instructions that, when executed by a processor of a network entity of a core network or a radio access network of a mobile communication system, cause the processor of the network entity to filter a multicast or broadcast service provided in the form of a multiplexed packet stream, the multiplexed packet stream being delivered from a service center via the network entity towards at least one mobile terminal, by:

receiving the multicast or broadcast service via multicast or broadcast, wherein the multicast or broadcast service is multicast or broadcast as a single bearer service and the multiplexed packet stream comprises a plurality of packet streams each being associated to quality-of-service attributes, receiving from an upstream network entity context information of the multicast or broadcast service, the context information comprising information on the packet streams belonging to the multicast or broadcast service, the quality-of-service attributes of the packet streams belonging to the multicast or broadcast service and, where applicable, combinations of the packet streams providing the multicast or broadcast service at different quality-of-service levels, obtaining from a quality-of-service management function of a service manager within the network entity quality-of-service constraints indicating a quality-of-service available for data transmission on each of a plurality of downstream interfaces of the network entity, selecting for a respective downstream interface of the network entity one of the packet streams of the multicast or broadcast service or a combination of the packet streams of the multicast or broadcast service transmittable downstream within the obtained quality-of-service constraints, wherein the selection is based on the context information of the multicast or broadcast service received from the upstream network entity, and forwarding the selected packet stream or streams of the multiplexed packet stream downstream towards the at least one mobile terminal, wherein the received context information on the quality-of-service attributes of the multiplexed packet stream indicates at least one of a guaranteed bandwidth of each of the packet streams, a delivery order of service data units, a maximum size of service data units, a service data unit format, a service data unit error ratio, a residual bit error ratio, an indication whether erroneous service data units should be delivered or discarded, a transfer delay parameter, a traffic handling priority of the single bearer service, and an Allocation/Retention Priority of the single bearer service.

* * * * *